(12) United States Patent
Kimura

(10) Patent No.: US 12,217,138 B2
(45) Date of Patent: Feb. 4, 2025

(54) INFORMATION PROCESSING DEVICE AND INFORMATION PROCESSING METHOD

(71) Applicant: SONY CORPORATION, Tokyo (JP)

(72) Inventor: Tomoya Kimura, Tokyo (JP)

(73) Assignee: SONY CORPORATION, Tokyo (JP)

( * ) Notice: Subject to any disclaimer, the term of this patent is extended or adjusted under 35 U.S.C. 154(b) by 1039 days.

(21) Appl. No.: 17/250,480

(22) PCT Filed: Jun. 21, 2019

(86) PCT No.: PCT/JP2019/024835
§ 371 (c)(1),
(2) Date: Jan. 26, 2021

(87) PCT Pub. No.: WO2020/026643
PCT Pub. Date: Feb. 6, 2020

(65) Prior Publication Data
US 2021/0216914 A1   Jul. 15, 2021

(30) Foreign Application Priority Data

Aug. 3, 2018 (JP) ................................. 2018-147178

(51) Int. Cl.
*G06F 7/00* (2006.01)
*G06F 16/245* (2019.01)
(Continued)

(52) U.S. Cl.
CPC ........... *G06N 20/00* (2019.01); *G06F 16/245* (2019.01); *G06F 16/53* (2019.01)

(58) Field of Classification Search
CPC .... G06F 16/245; G06F 16/53; G06F 16/3331; G06F 16/338; G06F 16/3349; G06F 16/3344; G06N 20/00; G06N 3/045
See application file for complete search history.

(56) References Cited

U.S. PATENT DOCUMENTS

2010/0142764 A1*  6/2010  Ikegami ................. G06V 40/12
                                                             713/168
2011/0075950 A1*  3/2011  Ohashi .................. G06V 10/50
                                                             382/305
(Continued)

FOREIGN PATENT DOCUMENTS

EP        1717737 A1    11/2006
JP     2000-122989 A     4/2000
(Continued)

OTHER PUBLICATIONS

International Search Report and Written Opinion of PCT Application No. PCT/JP2019/024835, issued on Sep. 10, 2019, 10 pages of ISRWO.

*Primary Examiner* — Mohammad A Sana
(74) *Attorney, Agent, or Firm* — CHIP LAW GROUP

(57) ABSTRACT

There is provided an information processing device that includes an acquisition unit configured to acquire first input data input when first output data is obtained in predetermined processing of obtaining output data with respect to input data, an extraction unit configured to extract second input data related to the first input data acquired by the acquisition unit based on a similarity degree between the first input data and each input history data, which is a history of input data of a case of past execution of the predetermined processing, from the input history data, and a presentation unit configured to present the second input data extracted by the extraction unit.

15 Claims, 20 Drawing Sheets

(51) Int. Cl.
     *G06F 16/53*      (2019.01)
     *G06N 20/00*      (2019.01)

(56) References Cited

U.S. PATENT DOCUMENTS

| | | | | |
|---|---|---|---|---|
| 2016/0350408 | A1* | 12/2016 | Lim | G06F 16/3331 |
| 2018/0350092 | A1* | 12/2018 | Sugaya | H04N 7/183 |
| 2019/0379795 | A1* | 12/2019 | Yamaji | H04N 1/00143 |

FOREIGN PATENT DOCUMENTS

| | | | |
|---|---|---|---|
| JP | 2001-142868 | A | 5/2001 |
| JP | 2002-149697 | A | 5/2002 |
| JP | 2002-207755 | A | 7/2002 |
| JP | 2006-309485 | A | 11/2006 |
| JP | 2014-006613 | A | 1/2014 |
| JP | 2017004260 | A | 1/2017 |
| JP | 2017-224184 | A | 12/2017 |
| JP | 2018045320 | A | 3/2018 |
| JP | 2018045531 | A | 3/2018 |

* cited by examiner

FIG.8

| LEARNING MODEL TYPE | LEARNING DATA ID | INPUT DATA | OUTPUT DATA | ENVIRONMENTAL INFORMATION | | | | | LABEL | LOSS |
|---|---|---|---|---|---|---|---|---|---|---|
| | | | | DATE | TEM-PERA-TURE | HU-MIDITY | OPERATING TIME | INDIVIDUAL ID | | |
| ... | ... | ... | ... | ... | ... | ... | ... | ... | ... | ... |
| GRASP OF OBJECT | A01 | B01 | C01 | D01 | E01 | F01 | G01 | H01 | SUCCESS | J01 |
| | A02 | B02 | C02 | D02 | E02 | F02 | G02 | H02 | SUCCESS | J02 |
| | A03 | B03 | C03 | D03 | E03 | F03 | G03 | H03 | FAILURE | J03 |
| ... | ... | ... | ... | ... | ... | ... | ... | ... | ... | ... |

| EXECUTION RESULT ID | EXECUTION RESULT | | | | EXTRACTED DATA |
|---|---|---|---|---|---|
| | INPUT DATA | OUTPUT DATA | LABEL | ENVIRONMENTAL INFORMATION | |
| ... | ... | ... | ... | ... | ... |
| K01 | B11 | C11 | SUCCESS | L01 | M01 |
| K02 | B12 | C12 | FAILURE | L02 | M02 |
| K03 | B13 | C13 | SUCCESS | L03 | M03 |
| ... | ... | ... | ... | ... | ... |

122

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2019/024835 filed on Jun. 21, 2019, which claims priority benefit of Japanese Patent Application No. JP 2018-147178 filed in the Japan Patent Office on Aug. 3, 2018. Each of the above-referenced applications is hereby incorporated herein by reference in its entirety.

FIELD

The present disclosure relates to an information processing device, an information processing method, and an information processing program. Specifically, the present disclosure relates to information processing for improving learning performance of machine learning.

BACKGROUND

In various technical fields, so-called machine learning in which an information processing device per se carries out learning for optimal output is used. Also, techniques for improving precision of machine learning and carrying out efficient learning have been proposed.

For example, there is known a technique of extracting images having typical defects from a plurality of defective images, which have been obtained by capturing test objects such as boards and have been collected, based on feature amounts of the images and carrying out learning by using the extracted images as teaching data. Also, there is known a technique of extracting images having low similarity degrees with respect to the images which have been used in past machine learning and preferentially learning the extracted images.

CITATION LIST

Patent Literature

Patent Literature 1: JP 2014-6613 A
Patent Literature 2: JP 2017-224184 A

SUMMARY

Technical Problem

According to the conventional techniques, efficiency of leaning can be enhanced by calculating similarity degrees between images by searching for feature amounts of the images, extracting learning data based on the calculated similarity degrees, and then carrying out learning.

However, the conventional techniques merely present particular images to users by using the similarity degrees of the images and cannot always present the information corresponding to various situations, for example, presentation of a cause of a case in which execution results using a learned model have problems.

Therefore, the present disclosure proposes an information processing device, an information processing method, and an information processing program which can present information useful for a user.

Solution to Problem

For solving the problem described above, an information processing device according to one aspect of the present disclosure has an acquisition unit configured to acquire first input data input when first output data is obtained in predetermined processing of obtaining output data with respect to input data, an extraction unit configured to extract second input data related to the first input data acquired by the acquisition unit based on a similarity degree between the first input data and each input history data, which is a history of input data of a case of past execution of the predetermined processing, from the input history data, and a presentation unit configured to present the second input data extracted by the extraction unit.

Advantageous Effects of Invention

According to the information processing device, the information processing method, and the information processing program according to the present disclosure, information useful for the user can be presented. The effects described herein are not necessarily limited, but may be any of the effects described in the present disclosure.

BRIEF DESCRIPTION OF DRAWINGS

FIG. 8 is a diagram illustrating an example of a learning-data storage unit according to the first embodiment of the present disclosure.

FIG. 9 is a diagram illustrating an example of an execution-result storage unit according to the first embodiment of the present disclosure.

DESCRIPTION OF EMBODIMENTS

Figure 1:
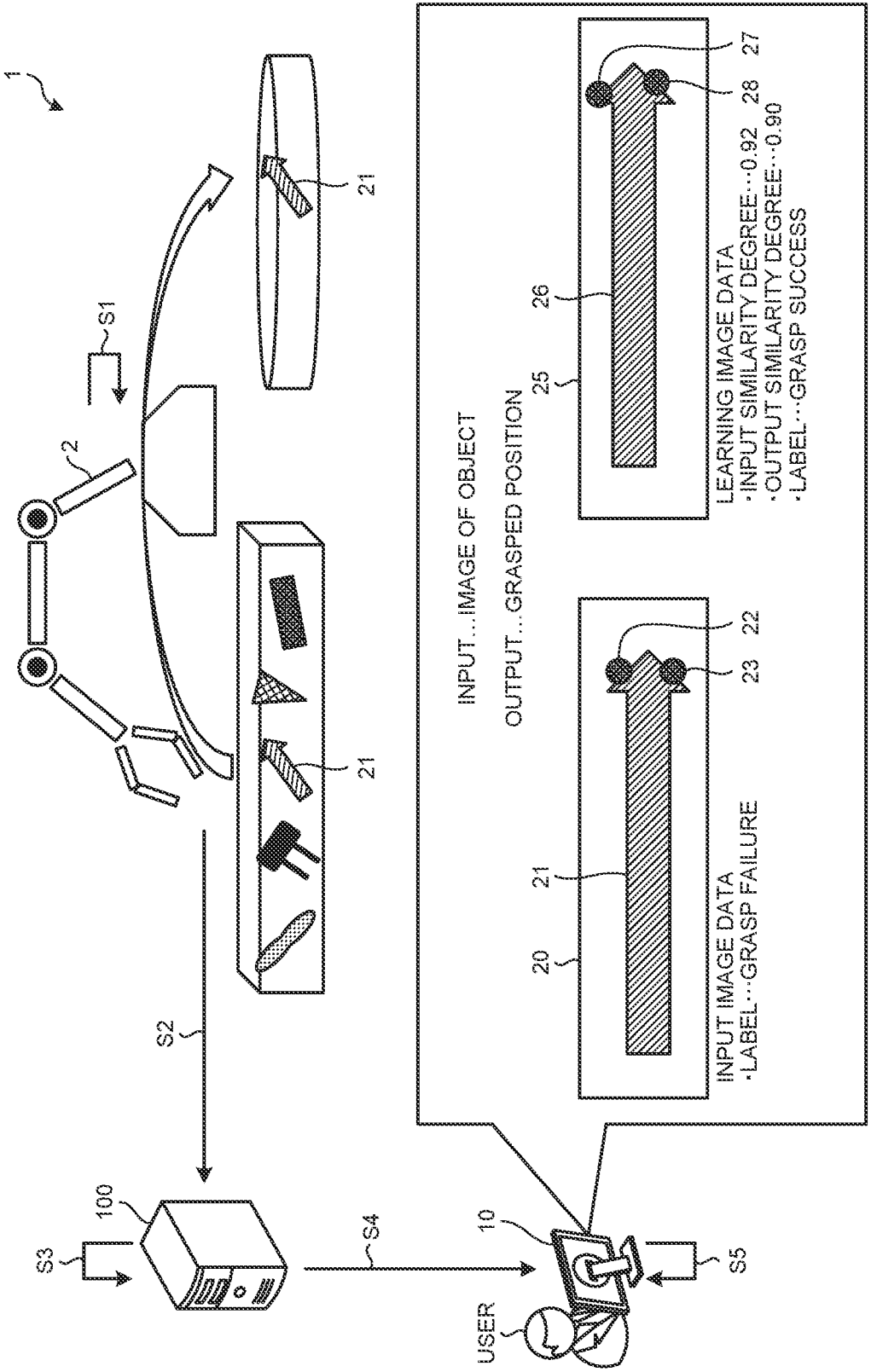
FIG. 1 is a diagram illustrating an information processing system according to a first embodiment of the present disclosure.

Hereinafter, embodiments of the present disclosure will be described in detail based on drawings. In following embodiments, the same parts are denoted by the same reference signs to omit redundant descriptions.

1. First Embodiment

[1-1. About Application Example of Information Processing According to the Present Disclosure]

In various technical fields, so-called machine learning in which a device per se carries out learning for optimal output is used. By using machine learning, predetermined hardware (for example, a robot) can carry out not only a movement determined in advance, but also can flexibly execute newly learned movements.

For example, in an example in which machine learning is applied to a grasping robot for grasping an object in a factory or the like, the grasping robot per se senses the shape, etc. of the object, acquires points to be grasped and the results of grasping, and carries out learning based on the acquired information. By virtue of this, the grasping robot can learn an appropriate grasping technique by repeating on-site grasping works even if the information about the object to be grasped is not input intentionally every time. Moreover, the grasping robot can also grasp an unknown object by an appropriate position by applying the information about grasping points, etc. of already learned objects.

In this manner, processing flexibly corresponding to various situations can be carried out since hardware per se carries out machine learning based on on-site processing and learns appropriate processing instead of incorporating a model learned in advance to the hardware. Such a technique in which learning is actively carried out on site is referred to as active learning or the like and is widely used on various sites such as factories.

Meanwhile, machine learning includes various techniques, and the process of learning is blackboxed in many cases. For example, there is a conceivable situation in which a person on the site cannot judge what kind of measure should be taken when the hardware which carries out machine learning is unable to carry out appropriate processing. In other words, for example in a case in which hardware fails in processing, it is difficult for a person on the site to see the reason that caused the failure or the information about the way learning is carried out.

Therefore, information processing according to the present disclosure provides information to a person who manages hardware (hereinafter, referred to as "user") by carrying out various information presenting processing about machine learning such as active learning. Specifically, according to the information processing according to the present disclosure, when the hardware executes predetermined processing, the user can obtain the information that leads to determination of the cause why that processing has been executed. By virtue of this, the user can appropriately correct the machine learning of the hardware. Therefore, learning efficiency can be improved, and success rate of predetermined processing can be improved. The information processing according to the present disclosure is not necessarily limited to use in processing of machine learning such as active learning, but can be also applied to events other than machine learning as long as logs about processing can be obtained in the events. Hereinafter, the information processing according to the present disclosure will be described with specific examples.

[1-2. Outlines of Information Processing According to First Embodiment]

FIG. 1 is a diagram illustrating outlines of information processing according to a first embodiment of the present disclosure. The information processing according to the first embodiment of the present disclosure is realized by an information processing system 1 illustrated in FIG. 1. The information processing system 1 includes an information processing device 100, a grasping robot 2, and a user terminal 10.

The information processing device 100 is an example of an information processing device according to the present disclosure and executes information processing according to the present disclosure. The information processing device 100 generates a learned model (hereinafter, simply referred to as "model") by executing machine learning about hardware and incorporates the generated model in the hardware, thereby improving the movement performance of the hardware.

The grasping robot 2 is an example of hardware according to the present disclosure and is a device which carries out machine learning about predetermined processing in cooperation with the information processing device 100. In the first embodiment, as the predetermined processing, the grasping robot 2 carries out processing of automatically grasping (picking) an object and moving the grasped object to a predetermined position without receiving any intentional operation. For example, the grasping robot 2 executes above described grasp processing by using a model learned based on learning data which uses image data, which shows the shape of an object to be grasped, as input and uses coordinate data of an image, which shows a grasp point showing which position of the object is to be grasped, as output.

The user terminal 10 is an example of a terminal device according to the present disclosure and is operated by a user who manages the information processing device 100 and the grasping robot 2. The user terminal 10 has a display and displays the information which is presented from the information processing device 100.

Hereinafter, the outlines of the information processing of the present disclosure will be described along a flow by using FIG. 1. In the example of FIG. 1, the grasping robot 2 has already incorporated a model, which has been learned based on learning data having a predetermined amount, and executes processing based on the model.

First, the grasping robot 2 specifies an object to be grasped (for example, an object to be removed) in an area in which various objects are placed. For example, the grasping robot 2 senses various objects by using a sensor (for example, a camera or the like) attached to an arm and specifies the object to be grasped based on similarity degrees between the feature amounts of the shapes of the various objects and the feature amounts of learned objects.

In the example of FIG. 1, the grasping robot 2 is assumed to have specified an object 21 as an object to be grasped. In this case, the grasping robot 2 grasps the object 21 by using the arm and executes processing of removing the object (Step S1).

In this process, the grasping robot 2 transmits the image data, which has been sensed upon grasping of the object 21, and the information about the point grasped upon the grasping (grasp point) to the information processing device 100 (Step S2).

The information processing device 100 acquires the information, which has been transmitted from the grasping robot 2, and calculates the similarity degree between the acquired information and each input history data, which is the history of the data input when grasp processing executed by the grasping robot 2 has been executed in the past. In the example of FIG. 1, the input history data is, for example, the input data (in the example of FIG. 1, the image data showing the shapes of objects) of the learning data used in generation of the model of the grasp processing. Alternatively, the input history data may be, for example, the input data of past grasp processing executed by the grasping robot 2 (image data capturing the object to be grasped).

The similarity degree is, for example, an index value indicating the similarity between the feature amount of the input data (in this example, image data) of machine learning and the feature amount of the input data (image data captured by the grasping robot 2) acquired upon execution of the grasp processing in Step S1. Details will be described later. However, the similarity degree in the present disclosure is the similarity of the feature amount of the input data of machine learning made into a numerical value, which is a value of 0 to 1.

Then, based on the calculated similarity degrees, the information processing device 100 extracts input data, which is related to the input data acquired in Step S2, from the input history data (Step S3). Specifically, the information processing device 100 extracts the input data that has the similarity degree exceeding a predetermined threshold value among the retained input history data. For example, the information processing device 100 may extract only one piece of the input data that has the highest similarity degree among the retained input history data.

Subsequently, the information processing device 100 transmits the extracted input data and the data, which has been acquired from the grasping robot 2 in Step S2, to the user terminal 10 (Step S4).

The user terminal 10 displays the received data by the display (Step S5). By virtue of this, the user can browse the information which is presented by the information processing device 100 to the user.

FIG. 1 illustrates an example of the information displayed by the user terminal 10. Execution data 20 is image data including the input data and the output data acquired when the grasping robot 2 executed predetermined processing in Step S1. Specifically, the execution data 20 includes the image data of the object 21, which has been captured when the grasping robot 2 executed grasp processing, as the input data. The execution data 20 also includes image data, in which the coordinates indicating the positions by which the object 21 was grasped (a grasp point 22 and a grasp point 23 illustrated in FIG. 1) when the grasping robot 2 executed grasp processing are superimposed on the object 21, as the output data. The execution data 20 may also include information labeled with the result of the grasp processing executed by the grasping robot 2 (hereinafter, simply referred to as "label"). The label of the grasp processing is, for example, information indicating whether the grasping robot 2 has succeeded in grasping (succeeded in grasping and moving the object 21) or not. The label may be automatically attached by the grasping robot 2 or may be input by the user. For example, in the example of FIG. 1, a label "grasp failure" is attached to the execution data 29. This indicates that the grasping robot 2 has failed in grasping when the grasping robot 2 grasped the object 21 by the grasp point 22 and the grasp point 23.

As illustrated in FIG. 1, the user terminal 10 displays learning data 25, which has been extracted in the information processing device 100 based on the execution data 20, together with the execution data 20. The learning data 25 is an example of learning data having input data similar to the input data, which has been acquired when the grasping robot 2 executed the predetermined processing in Step S1.

The learning data 25 is one piece of the data used in learning of the model related to the grasp processing of the grasping robot 2 and includes image data of an object 26 to be grasped as input data. The learning data 25 also includes image data, in which the coordinates indicating the positions by which the object 26 was grasped (a grasp point 27 and a grasp point 28 illustrated in FIG. 1) when the grasping robot 2 executed the grasp processing are superimposed on the object 26, as output data.

For example, the object 26, which is the input data of the learning data 25, has a similarity degree "0.92" with respect to the object 21, which is the input data of the execution data 20. This numerical value indicates that the object 26 and the object 21 are the objects having extremely similar shapes. The grasp point 27 and the grasp point 28, which are the output data of the learning data 25, have a similarity degree "0.90" with the grasp point 22 and the grasp point 23, which are the output data of the execution data 20. This numerical value indicates that the grasp point 27 and the grasp point 28 are in the relation that they are extremely similar to the grasp point 22 and the grasp point 23 as the positions corresponding to the object 21 and the object 26.

The learning data 25 may also include a label of a case in which the grasping robot 2 has executed grasp processing. For example, in the example of FIG. 1, a label "grasp success" is attached to the learning data 25. This indicates that the grasping robot 2 has succeeded in grasping when the grasping robot 2 grasped the object 26 by the grasp point 27 and the grasp point 28.

In this manner, after the grasp processing by the grasping robot 2 is executed, the user can check the learning data 25, which is similar to the execution data 20 of this processing, via the user terminal 10. For example, the user may be motivated by failure of the grasping robot 2 in grasping and request extraction processing to the information processing device 100 and similar input history data. Alternatively, the information processing device 100 may automatically detect the fact that the grasping robot 2 has failed in grasping and transmit similar input history data to the user terminal 10 together with a predetermined alert.

By browsing the learning data 25, the user can assume that the grasping robot 2 has judged to "grasp the object 21, which has a similar shape to the object 26, by the grasp point 22 and the grasp point 23 similar to the grasp point 27 and the grasp point 28 by which the object 26 was successfully grasped" in Step S1. Moreover, since the user can visually check the output data by browsing the learning data 25, the user can find out that the grasp point 27 and the grasp point 28 are not appropriate for the shape like the object 26. Moreover, the user can assume that the grasping robot 2 has grasped "the grasp point 22 and the grasp point 23", which are judged by humans to be not really appropriate, because the label of the learning data 25 is "grasp success".

Then, in view of the above described circumstances, the user can make a judgment to delete the learning data 25 from a learning data group (or lower the importance degree of the learning data 25 in learning). In other words, the user judges that the learning data 25 adversely affects the model since "grasping accidentally succeeded" in the learning data 25 in the process of learning of the grasping robot 2. Then, the user can cause the device to carry out appropriate learning by relearning of the grasp processing with the learning data group excluding the learning data 25 (in other words, updating the model).

In this manner, when certain processing is executed by hardware, the information processing device 100 can cause the user to be aware of a problematic point in learning by extracting the data, which is similar to the input data of execution, and presenting the data to the user. By virtue of this, the user can judge whether the machine learning is appropriately carried out or not or can efficiently find out a problematic point (specifically, learning data with a problem) of a case in which appropriate processing results are not obtained.

The information processing device 100 may present various information to the user other than that illustrated in FIG. 1. Hereinafter, variations of the information presented by the information processing device 100 will be described by using FIG. 2 to FIG. 6.

Figure 2:
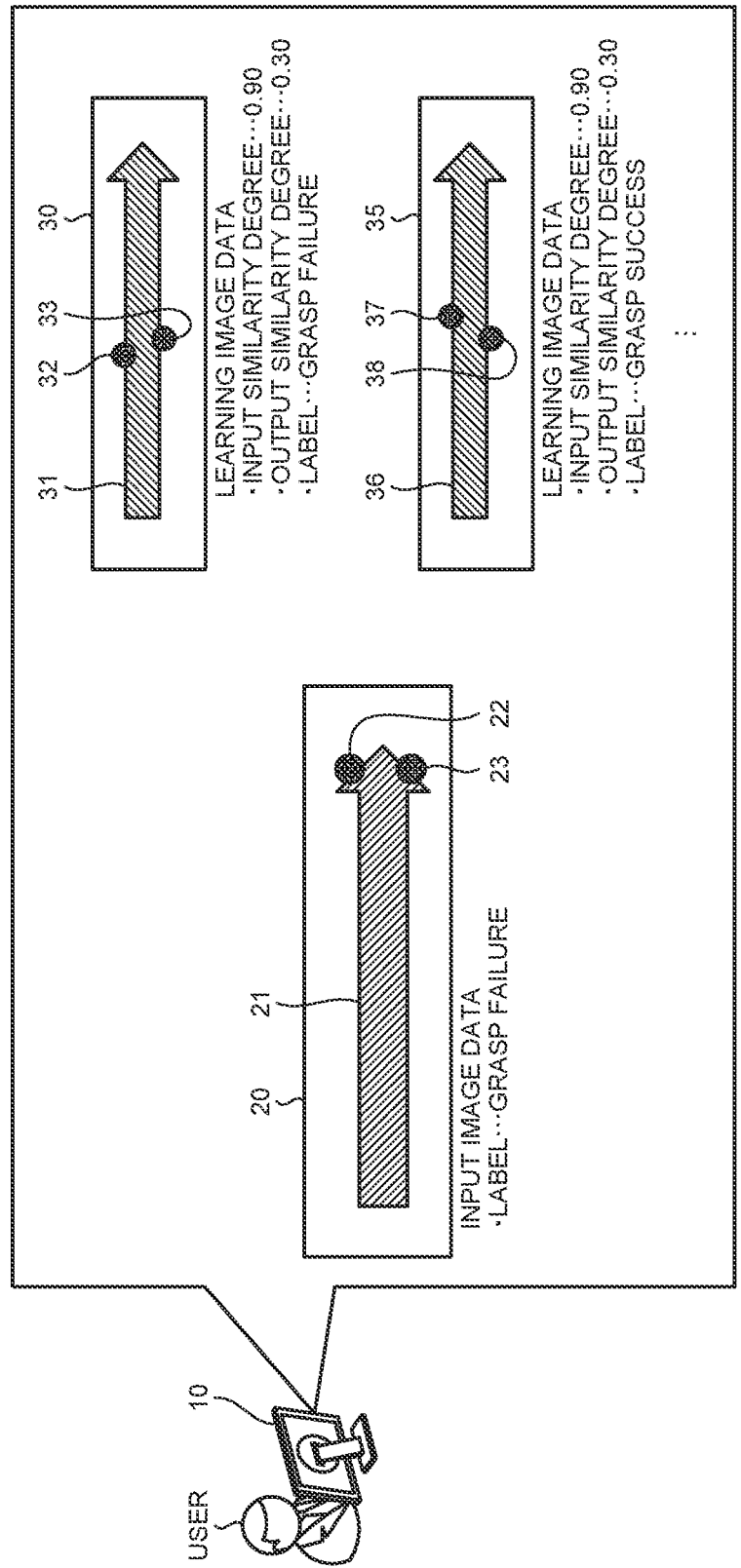
FIG. 2 is a diagram (1) illustrating an example of information presented to a user in the present disclosure.

FIG. 2 is a diagram (1) illustrating an example of the information presented to the user in the present disclosure. In the example of FIG. 2, the information processing device 100 presents learning data 30 and learning data 35 in which "the input data is similar, and the output data is not similar" with respect to the execution data 20.

For example, an object 31, which is the input data of the learning data 30, has a similarity degree "0.90" with respect to the object 21, which is the input data of the execution data 20. This numerical value indicates that the object 31 and the object 21 are the objects having extremely similar shapes. A grasp point 32 and a grasp point 33, which are the output data of the learning data 30, have a similarity degree "0.30" with the grasp point 22 and the grasp point 23, which are the output data of the execution data 20. This numerical value indicates that the grasp point 32 and the grasp point 33 are in the relation that they are not similar to the grasp point 22 and the grasp point 23 as the positions corresponding to the object 21 and the object 31. The example of FIG. 2 illustrates that a label "grasp failure" is attached to the learning data 30.

Since the user can visually check the output data by browsing the learning data 30, the user can find out that the grasp point 32 and the grasp point 33 are appropriate for the shape like the object 31. However, in the execution data 20, the grasping robot 2 selects the grasp point 22 and the grasp point 23, which are different from those of the learning data 30.

Under such circumstances, the user to whom the learning data 30 is presented can assume that the grasping robot 2 may have judged to have the output different from that of the learning data 30 in Step S1 since the learning data 30 is "grasp failure". In other words, the user can assume that the grasping robot 2 may have judged that "the grasp point 22 and the grasp point 23, which are the grasp points different from those of the learning data 30 (in which grasp failed), should be grasped with respect to the object 21 having a shape similar to the object 31".

Then, in view of the above described circumstances, the user can make a judgment to delete the learning data 30 from a learning data group (or lower the importance degree of the learning data 30 in learning). In other words, the user judges that the learning data 30 adversely affects the model since "grasping accidentally failed" in the relation between the input data and the output data illustrated in the learning data 30 in the process of learning of the grasping robot 2. Then, the user can cause the device to carry out appropriate learning by relearning of the grasp processing with the learning data group excluding the learning data 30 (in other words, updating the model).

Since the label of "grasp failure" is attached to the learning data 30, the user can also suppose problematic points other than the grasp points. In other words, the user can suppose that problematic points of the grasping robot 2 are not limited to the coordinates of the grasp points. Specifically, the user can suppose that there may be other points to be improved such as the frictional force and the grasping pressure of the arm of the grasping robot 2, the suction force of suction disks attached to the arm, etc.

At the same time, the information processing device 100 may present the learning data 35, which has the same similarity degree as the similarity degree of the input data of the learning data 30. For example, an object 36, which is the input data of the learning data 35, has a similarity degree "0.90" with respect to the object 21, which is the input data of the execution data 20. This numerical value indicates that the object 36 and the object 21 are the objects having extremely similar shapes. A grasp point 37 and a grasp point 38, which are the output data of the learning data 30, have a similarity degree "0.30" with the grasp point 22 and the grasp point 23, which are the output data of the execution data 20. This numerical value indicates that the grasp point 37 and the grasp point 38 are in the relation that they are not similar to the grasp point 22 and the grasp point 23 as the positions corresponding to the object 21 and the object 36. The example of FIG. 2 illustrates that a label "grasp success" is attached to the learning data 30.

Since the user can visually check the output data by browsing the learning data 35, the user can find out that the grasp point 37 and the grasp point 38 are appropriate for the shape like the object 31. However, in the execution data 20, the grasping robot 2 selects the grasp point 22 and the grasp point 23, which are different from those of the learning data 35.

Under such circumstances, the user to whom the learning data 35 has been presented can suppose the possibility that the grasping robot 2 is carrying out erroneous learning with the learning data which has larger influence than the learning data 35. By virtue of this, the user can take a measure of causing the information processing device 100 to extract the learning data, which has a high similarity degree to the output data of the execution data 20, again. Alternatively, the user can consider various measures such as increasing the importance degree of learning of the learning data 35 and relearning by increasing learning data, which is similar to the learning data 35.

As illustrated in FIG. 2, the information processing device 100 may extract the input history data having the output result similar to the execution data 20 or may extract the input history data having the output result not similar to the execution data 20. In this manner, the information processing device 100 can provide various information about learning to the user by feeding back the various information to the user.

Figure 3:
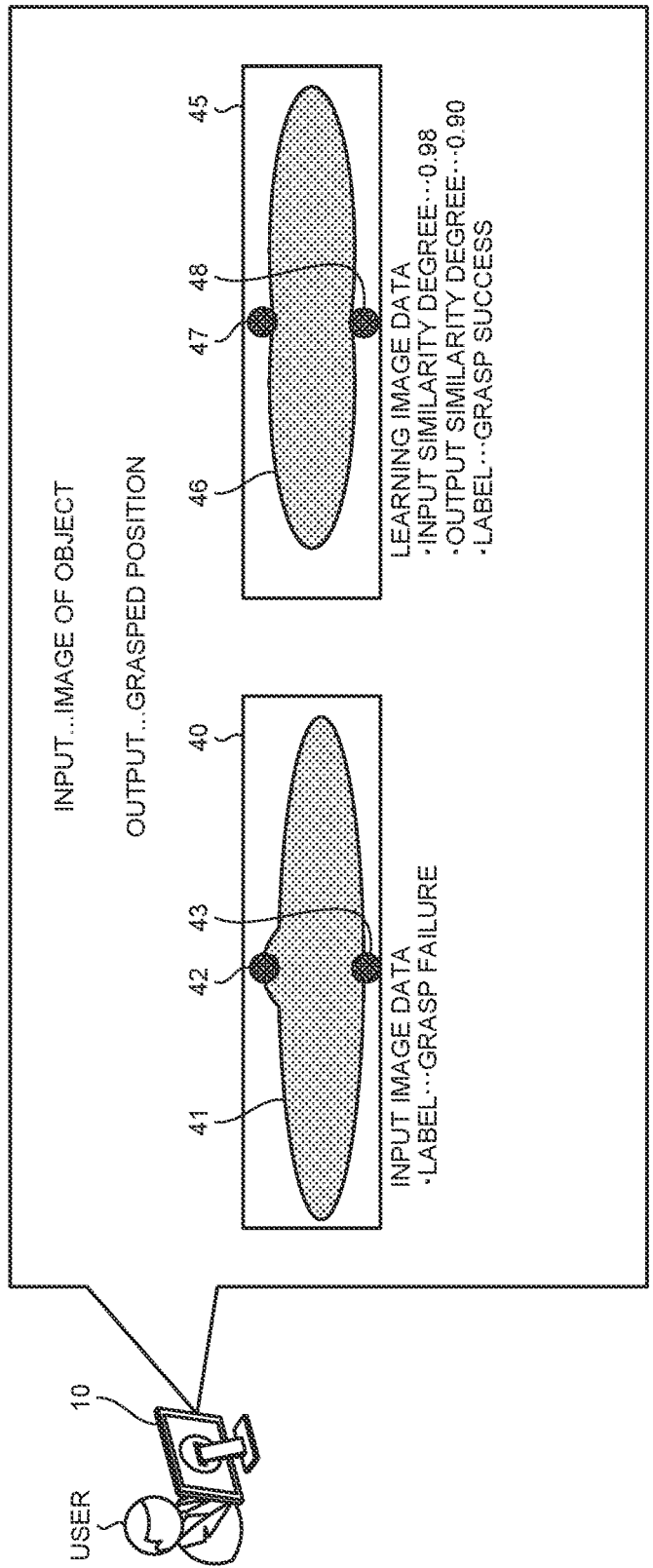
FIG. 3 is a diagram (2) illustrating an example of the information presented to the user in the present disclosure.

Subsequently, another example of the information presented to the user will be described by using FIG. 3. FIG. 3 is a diagram (2) illustrating an example of the information presented to the user in the present disclosure.

FIG. 3 illustrates an example in which learning data 45 is extracted and presented to the user with respect to execution data 40. The execution data 40 includes image data about an object 41 as input data. The execution data 40 also includes a grasp point 42 and a grasp point 43 as output data. Also, a label "grasp failure" is attached to the execution data 40.

The learning data 45 includes image data about an object 46 as input data. The learning data 45 also includes a grasp point 47 and a grasp point 48 as output data. Also, a label "grasp success" is attached to the learning data 45. The similarity degree of the input data of the learning data 45 with respect to the execution data 40 is "0.98", and the similarity degree of the output data is "0.90". This indicates that the information processing device 100 has determined that the input data and the output data of the execution data 40 and the input data and the output data of the learning data 45 are extremely similar to each other.

By browsing the presented execution data 40, the user can judge that it is not an appropriate grasp point since the grasp point 42 abuts a protruding part of the object 41. Also, the user supposes that the grasping robot 2 has judged that "grasping would succeed when it is grasped by similar points since the object 41 and the object 46 are extremely similar". In other words, the example of FIG. 3 presents two examples in which the results of grasping are different since the shapes of the protruding parts are different although these are objects having similar shapes. In this case, the user can judge that the learning data 45 is not appropriate (or only the learning data 45 is insufficient) in leaning of the event of grasping the object 41. Therefore, the user can take a measure such as further collecting learning data about objects having shapes similar to that of the object 41 or deleting the learning data 45 from the learning data.

Figure 4:
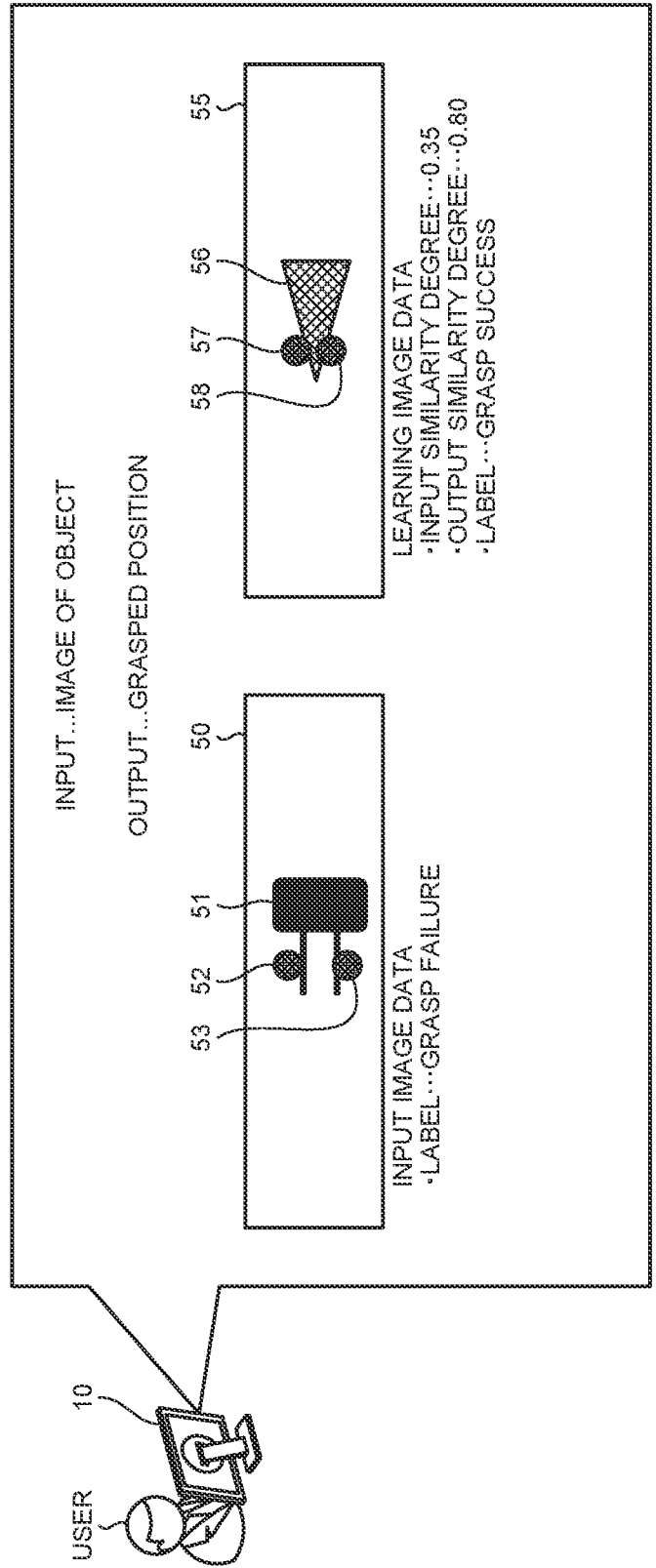
FIG. 4 is a diagram (3) illustrating an example of the information presented to the user in the present disclosure.

Subsequently, another example of the information presented to the user will be described by using FIG. 4. FIG. 4 is a diagram (3) illustrating an example of the information presented to the user in the present disclosure.

FIG. 4 illustrates an example in which learning data 55 is extracted and presented to the user with respect to execution data 50. The execution data 50 includes image data about an object 51 as input data. The execution data 50 also includes a grasp point 52 and a grasp point 53 as output data. Also, a label "grasp failure" is attached to the execution data 50.

The learning data 55 includes image data about an object 56 as input data. The learning data 55 also includes a grasp point 57 and a grasp point 58 as output data. Also, a label "grasp success" is attached to the learning data 55. The similarity degree of the input data of the learning data 55 with respect to the execution data 50 is "0.35", and the similarity degree of the output data is "0.80". This indicates, for example, a situation in which the information processing device 100 has searched for input history data similar to the execution data 50, but only found the learning data 55 having the similarity degree "0.35".

By browsing the presented execution data 50, the user can judge that the grasp point 52 and the grasp point 53 are not appropriate positions for grasping the object 51. The user also supposes that the grasping robot 2 "has searched for a shape similar to the object 51, but, since there is no similar shape, carried out grasping at the positions similar to the output data of the object 56 having a most similar shape". In other words, in the example of FIG. 4, since the learning data having the input data similar to the object 51 is not present in the first place in the learning data group, the example which has supposedly failed in grasping of the object 51 is presented. In this case, the user can judge that learning data is insufficient in the first place in the learning of the event of grasping the object 51. Therefore, the user can take a measure such as collecting learning data about the objects having shapes similar to the object 51.

Figure 5:
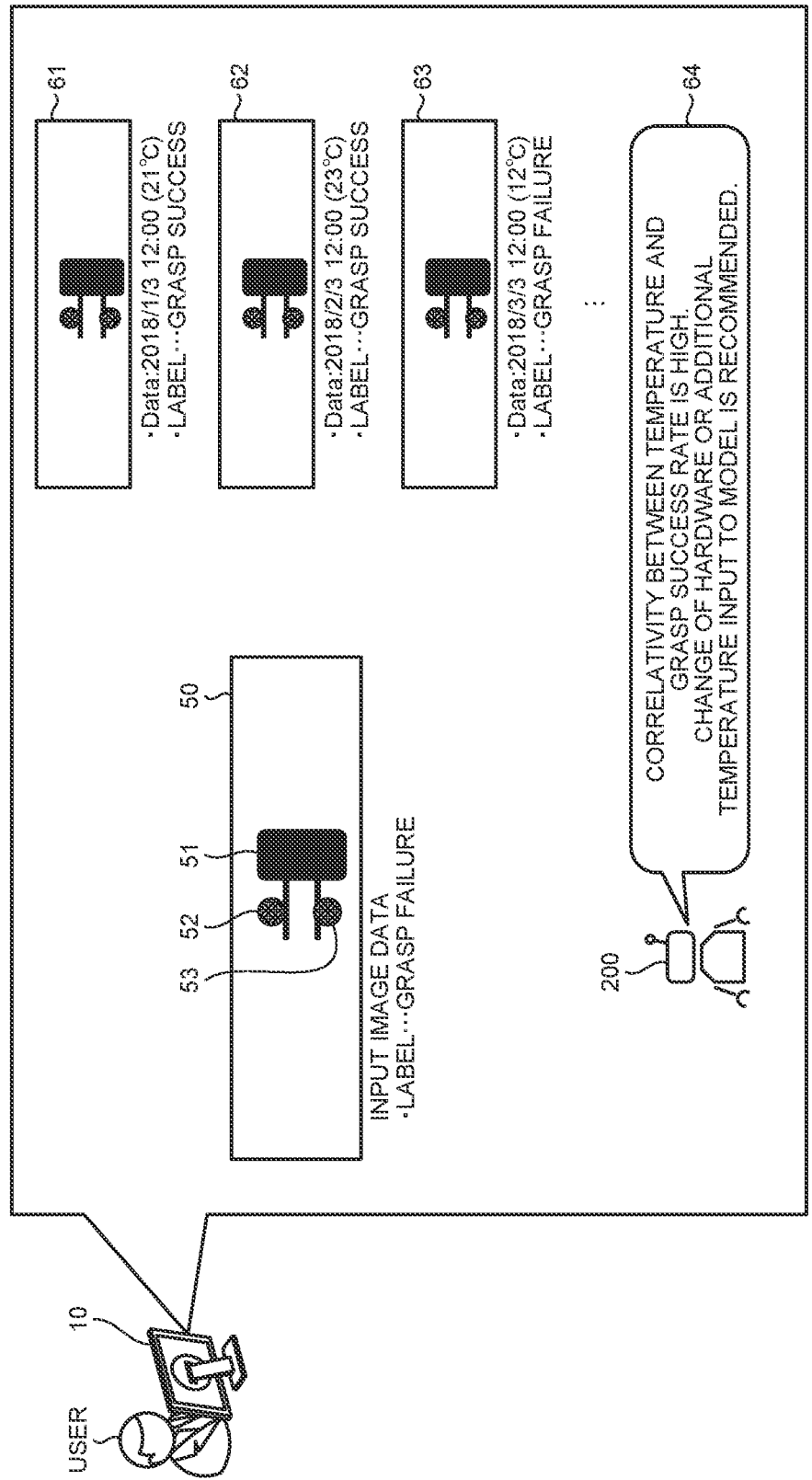
FIG. 5 is a diagram (4) illustrating an example of the information presented to the user in the present disclosure.

Subsequently, another example of the information presented to the user will be described by using FIG. 5. FIG. 5 is a diagram (4) illustrating an example of the information presented to the user in the present disclosure.

FIG. 5 illustrates an example of a case in which many pieces of similar learning data and past execution data are present with respect to the execution data 50 illustrated in FIG. 4. FIG. 5 illustrates the example of the case in which presentation information generated by the information processing device 100 is presented together with the learning data. The presentation information is the information which indicates a factor(s) expected in the execution results of predetermined processing based on analysis results of the execution data by the information processing device 100. The information processing device 100 can provide the information as if the information processing device 100 gives advice to the user, for example, by presenting an agent 200 together with the presentation information.

Figure 6:
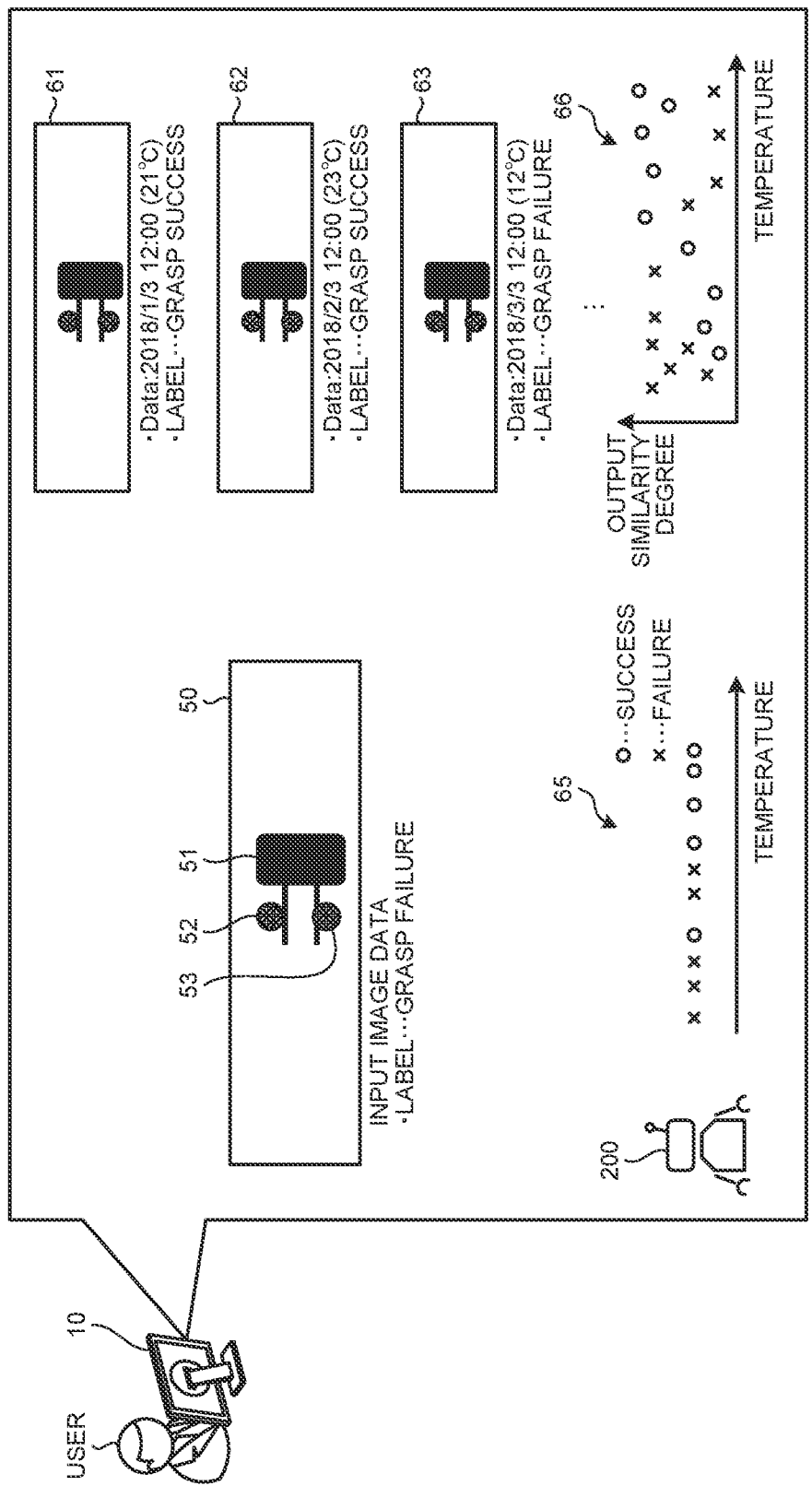
FIG. 6 is a diagram (5) illustrating an example of the information presented to the user in the present disclosure.

Execution result data 61, execution result data 62, and execution result data 63 illustrated in FIG. 6 include execution results in situations in which environmental information such as temperatures and humidity are different when predetermined processing is carried out. The input data and the output data in the execution result data 61, the execution result data 62, and the execution result data 63 are extremely similar to the execution data 50. FIG. 5 illustrates the example in which the information processing device 100 presents three pieces of the execution result data. However, in practice, the information processing device 100 is assumed to carry out comparative verification between execution result data, which is more than three pieces, and the execution data 50.

In the example illustrated in FIG. 5, the information processing device 100 is assumed to have verified the correlativity between the execution results (labels) and the environmental information in predetermined processing. Then, the information processing device 100 judges that a significant correlation has been observed between the temperature and the labels. In this case, the information processing device 100 determines that a factor that affects the label is "temperature" and generates a message 64 indicating this fact. For example, the information processing device 100 generates the message 64 including advice to the user such as "The correlativity between the temperature and the grasp success rate is high. Change of hardware or additional temperature input to the model is recommended." and presents the message to the user. By virtue of this, the user can find out the factor(s) affecting the execution results of predetermined processing without considering the factors by himself/herself.

Subsequently, another example of the information presented to the user will be described by using FIG. 6. FIG. 6 is a diagram (5) illustrating an example of the information presented to the user in the present disclosure.

FIG. 6 illustrates an example in which the agent 200 presents a graph 65 and a graph 66 with respect to the message 64 illustrated in FIG. 5. For example, the information processing device 100 generates the graph 65, in which the relation between the temperature and execution results is plotted in one dimension, based on the history of past execution results and presents the graph to the user. Also, the information processing device 100 may generate the graph 66, in which the relations between the temperature, the output similarity degrees (grasp points), and execution results are plotted in two dimensions, based on the history of past execution results and present the graph to the user. In this manner, the information processing device 100 may present information to the user in various forms such as sentences, graphs, etc. By virtue of this, the user can understand the factor(s) affecting the execution results of processing at a glance.

Hereinabove, as described by using FIG. 1 to FIG. 6, the information processing device 100 calculates the similarity degree between the data input upon execution of predetermined processing and history data (learning data or execution result data) and extracts part of the history data based on the similarity degrees. The information processing device 100 may generate the presentation information based on the environmental information or label correlativity included in the extracted history data. By virtue of this, the information processing device 100 can understandably present, to the user, the cause of failure of the processing executed by hardware such as the grasping robot 2, the learning data serving as a factor adversely affecting machine learning, etc.

[1-3. Configuration of Information Processing Device According to First Embodiment]

Figure 7:
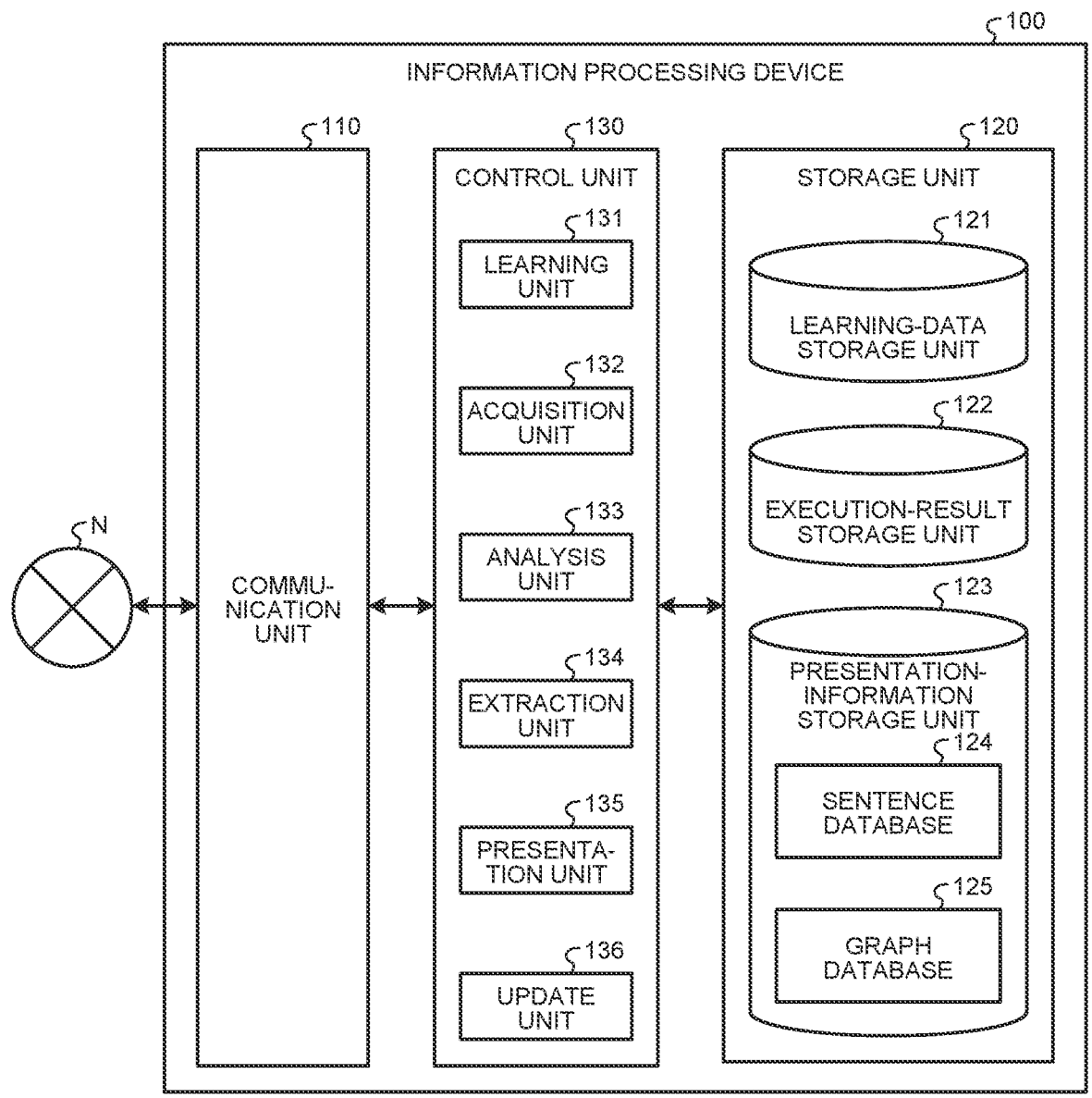
FIG. 7 is a diagram illustrating a configuration example of an information processing device according to the first embodiment of the present disclosure.

Next, a configuration of the information processing device 100, which executes information processing according to the first embodiment, will be described. FIG. 7 is a diagram illustrating a configuration example of the information processing device 100 according to the first embodiment of the present disclosure.

As illustrated in FIG. 7, the information processing device 100 has a communication unit 110, a storage unit 120, and a control unit 130. The information processing device 100 may have an input unit (for example, a keyboard, a mouse, etc.), which receives various operations from an administrator or the like who manages the information processing device 100, and a display unit (for example, liquid crystal display or the like) for displaying various information.

The communication unit 110 is realized, for example, by a network interface card (NIC) or the like. The communication unit 110 is connected to a network N (for example, the Internet) by wire or wirelessly and transmits/receives information to/from the grasping robot 2, the user terminal 10, etc. via the network N.

The storage unit 120 is realized by, for example, a semiconductor memory element such as a random access memory (RAM), a flash memory (Flash Memory), or the like or a storage device such as a hard disk, an optical disk, or the like. The storage unit 120 has a learning-data storage unit 121, an execution-result storage unit 122, and a presentation-information storage unit 123. Hereinafter, the storage units will be described in order.

The learning-data storage unit 121 stores learning data groups used in model generation. For example, in learning about grasping of an object, learning data includes a data set of image data of the object to be grasped and coordinates of a grasp point, which is correct data of the image data. The learning data may be appropriately acquired from an external server or the like instead of retaining the data in the information processing device 100.

FIG. 8 illustrates an example of the learning-data storage unit 121 according to the first embodiment. FIG. 8 is a diagram illustrating an example of the learning-data storage unit 121 according to the first embodiment of the present disclosure. In the example illustrated in FIG. 8, the learning-data storage unit 121 has items such as "learning model type", "learning data ID", "input data", "output data", "environmental information", "label", and "LOSS".

The "learning model type" indicates the type of an event executed by a model (processing executed by hardware). The "learning data ID" is identification information which identifies learning data.

The "input data" indicates input data of the learning data. The "output data" indicates output data in the learning data. In FIG. 8, the data, etc. of the input data, the output data, and other items is represented by general ideas such as "A01" and "B01". However, in practice, each item stores specific information corresponding to the item. For example, in the item of the input data, image data showing the shape of an object is stored. In the output data, the data showing the coordinates at which the object is to be grasped is stored.

The "environmental information" indicates the information related to the environment upon execution of predetermined processing. The environmental information is measured, for example, by a sensor or the like provided in the grasping robot 2 or the information processing device 100. The environmental information has small items such as "date", "temperature", "humidity", "operating time", and "individual ID".

The "date" indicates the date on which the predetermined processing was executed. The "temperature" indicates the temperature at the time when the predetermined processing was executed. The "humidity" indicates humidity at the time when the predetermined processing was executed. The "operating time" indicates the time during which the hardware operated when the predetermined processing was executed. The "individual ID" indicates the identification information that identifies the hardware which has executed the predetermined processing.

The "label" indicates arbitrary information attached to the result of the predetermined processing. For example, the label is the information such as "success" or "failure" indicating whether the execution result was a desirable result or not. The label is not required to be attached depending on the type of learning.

The "LOSS" is the value indicating a loss in machine learning. For example, in machine learning, learning is carried out so as to minimize the LOSS (loss). The LOSS is the value calculated for each individual learning data and is obtained, for example, by an error between model output and correct output. The larger the LOSS, the larger the correction amount of parameters of the model. Therefore, it can be said that the larger the LOSS of the learning data, the larger the influence thereof on the model.

More specifically, the example illustrated in FIG. 8 illustrates that an example of the learning data of a case in which the learning model type is "grasp of object" is learning data identified by a learning data ID "A01". The learning data ID "A01" indicates that the input data is "B01", the output data is "C01", the date on which the processing was carried out is "D01", the temperature at that time is "E01", the humidity is "F01", the operating time is "G01", and the individual ID of the hardware, which has carried out the processing, is "H01". The learning data ID "A01" indicates that the label is "success" and the LOSS is "J01".

Next, the execution-result storage unit 122 will be described. The execution-result storage unit 122 stores the results of predetermined processing executed by hardware.

FIG. 9 illustrates an example of the execution-result storage unit 122 according to the first embodiment. FIG. 9 is a diagram illustrating an example of the execution-result storage unit 122 according to the first embodiment of the present disclosure. In the example illustrated in FIG. 9, the execution-result storage unit 122 has items such as "execution result ID", "execution result", and "extracted data".

The "execution result ID" indicates the identification information that identifies the results of the carried out predetermined processing. The "execution result" indicates specific information of the results of the carried out predetermined processing. In each of "input data", "output data", "label", and "environmental information", the information corresponding to the same item illustrated in FIG. 8 is stored.

"Extracted data" indicates the data extracted by the information processing device 100 based on the execution result. The extracted data is, for example, the data extracted based on the execution result and the similarity degree or the like of the input data with respect to learning data and other execution result data when a request of the user or predetermined processing fails. The extracted data is not limited to one piece of data, but may be plural pieces of data.

More specifically, the example illustrated in FIG. 9 illustrates that the execution result identified by an execution result ID "K01" has input data "B11", output data "C11", a label "success", and environmental information "L01". The data extracted based on the execution result identified by the execution result ID "K01" is illustrated to be "M01".

Next, the presentation-information storage unit 123 will be described. The presentation-information storage unit 123 stores the information which is used when the information processing device 100 generates presentation information. For example, the presentation-information storage unit 123 has a sentence database 124 and a graph database 125.

The sentence database 124 stores sentences serving as bases for generating messages, which are examples of the presentation information, and the information about variables to be inserted in the sentences. The variables are, for example, factors having correlativity with the execution results.

The graph database 125 stores image data (for example, image data used for displaying bar graphs and line graphs) such as graphs which serve as bases for generating graphs, which are examples of the presentation information, and stores information about variables to be used for generating the graphs. The variables are, for example, factors having correlativity with the execution results.

Returning to FIG. 7, descriptions will be continued. The control unit 130 is realized, for example, by executing a program (for example, an information processing program according to the present disclosure) stored in the information processing device 100 by a central processing unit (CPU), a micro processing unit (MPU), or the like while using a random access memory (RAM) or the like as a work area. The control unit 130 is a controller and may be realized, for example, by an integrated circuit such as an application specific integrated circuit (ASIC) or a field programmable gate array (FPGA).

As illustrated in FIG. 7, the control unit 130 has a learning unit 131, an acquisition unit 132, an analysis unit 133, an extraction unit 134, a presentation unit 135, and an update unit 136 and realizes or executes the functions or working of information processing described below. The internal configuration of the control unit 130 is not limited to the configuration illustrated in FIG. 7, but may be another configuration as long as it is a configuration which carries out later-described information processing.

The learning unit 131 carries out the learning for generating a learning model based on the learning data stored in the learning-data storage unit 121. The type of the learning processing executed by the learning unit 131 is not specified by any type. For example, the learning unit 131 may generate a model by using various learning algorithms such as neural networks, support vector machines, clustering, and reinforcement learning.

The acquisition unit 132 acquires various information. For example, the acquisition unit 132 acquires input data (hereinafter, will be referred to as "first input data" for distinguishment) which has been input when arbitrary output data (hereinafter, referred to as "first output data" for distinguishment) in predetermined processing for obtaining output data with respect to input data. More specifically, the acquisition unit 132 acquires the input data of the case in which the predetermined processing is executed by the hardware in which a model is incorporated. In other words, the acquisition unit 132 acquires the first input data, which has been input when the first output data is obtained from the predetermined learning model.

The acquisition unit 132 may acquire the first input data, which includes environmental information in the predetermined processing in which the first output data is obtained.

For example, the acquisition unit 132 acquires the temperature, humidity, etc. at the time when the predetermined processing is executed via the sensor, etc. installed in the hardware. The acquisition unit 132 may acquire, for example, the date of execution of the predetermined processing, the individual ID of the hardware, and the operating time of the hardware.

The acquisition unit 132 may acquire the first input data to which a label indicating the result of the predetermined processing is attached. For example, the acquisition unit 132 acquires the first input data, to which a label has been attached by a human or a label or the like automatically determined based on the execution result has been attached, after the predetermined processing is executed.

The analysis unit 133 executes various analysis with respect to the first input data acquired by the acquisition unit 132. For example, the analysis unit 133 calculates the similarity degree between the first input data and each of the input history data, which is the history of the input data of the case in which the predetermined processing has been executed in the past. In this case, the input history data includes learning data and past execution result data.

For example, the analysis unit 133 calculates the similarity degree between the first input data and each of the input data based on the feature amount, which is derived when the first input data is input to the model, and the feature amount, which is derived when the other input data is input to the model. In this case, the analysis unit 133 can reduce the amount of calculation, for example, by using the feature amount in an intermediate layer of a neural network as the feature amount. The analysis unit 133 may use a dimensional compressor such as principal component analysis or an autoencoder and use the information, in which the amount of the information of the input data has been reduced, as the feature amount. Other than that, the analysis unit 133 may calculate the similarity degree by appropriately using a known technique of calculating the feature amount of the input data.

The analysis unit 133 may also calculate the correlativity between the result of the predetermined processing and a factor which is estimated to have affected the result of the predetermined processing. Details of the processing will be described later.

The extraction unit 134 extracts second input data, which is related to the first input data, from the input history data based on the similarity degree between the first input data, which has been acquired by the acquisition unit 132, and each of the input history data, which is the history of the input data of the case in which the predetermined processing has been executed in the past. Herein, the second input data refers to, for example, the data, which is compared with the execution result, such as the learning data 25 (more specifically, the image data of the object 26 which is the input data) presented to the user together with the execution data 20 in FIG. 1.

For example, as the second input data, the extraction unit 134 may extract, as the second input data, in which the input history data having the output result similar to the first output data is obtained. More specifically, the extraction unit 134 extracts the second input data, which is similar to the first input data both in the input data and the output data. When such data is extracted and presented, the user can recognize that, for example, what kind of data is the learning data that is expected to have strongly affected execution of the processing.

The extraction unit 134 may also extract, as the second input data, plural pieces of data including the input history data, in which the output result similar to the first output data has been obtained, and the input history data having the output result not similar to the first output data. When the data is extracted and presented, plural pieces of data, which are different pieces of output data even though the input data thereof is similar to each other, can be compared, and the user can therefore easily understand, for example, problematic points in the learning and the data appropriate for updating the model.

The extraction unit 134 may preferentially extract, as the second input data, data in descending order of the similarity degree with respect to the first input data among the input history data. For example, the extraction unit 134 may extract the data having the highest similarity degree only or may preferentially extract a predetermined number of pieces of data in descending order of the similarity degree.

The extraction unit 134 may also extract the second input data including environmental information. Specifically, the extraction unit 134 extracts second input data including temperatures, humidity, etc. as the environmental information. When such data is extracted and presented, the user can carry out verification including the environmental information which has been taken upon execution of the predetermined processing.

The extraction unit 134 may execute the processing of extracting the second input data related to the first input data if the label attached to the first input data is a predetermined result designated in advance. For example, in a case in which the predetermined processing is "grasp of an object", the extraction unit 134 may automatically extract second input data related to first input data if the first input data to which a label "failure in grasping of object" is attached is acquired. By virtue of this, the user can quickly carry out verification since the learning data which can be a failure factor(s) can be presented when the processing fails without an unnecessary request of extraction.

The extraction unit 134 may extract the second input data to which the label is attached based on the similarity degree between the first input data and the input history data to which labels are attached. More specifically, the extraction unit 134 extracts, for example, the learning data to which the same labels are attached or the learning data to which different labels are attached although the input data thereof is similar. By virtue of this, the user can carry out verification from various viewpoints about the execution results of the predetermined processing.

The extraction unit 134 may carry out processing of statistically sorting plural pieces of second input data based on the variables associated with the plural pieces of second input data. For example, when plural pieces of similar execution result data are obtained as illustrated in FIG. 6, the extraction unit 134 sorts the data based on a statistical method (clustering or the like). Then, the extraction unit 134 passes the sorted results to the presentation unit 135. By virtue of this, the user can easily understand the correlativity between a predetermined variable (temperature, in the example of FIG. 6) and the input data, for example, as illustrated in the graph 65 or the graph 66 illustrated in FIG. 6.

The presentation unit 135 presents the second input data extracted by the extraction unit 134. The presentation unit 135 presents the second input data to a display unit if the device per se has the display unit such as a display. If the device per se does not have a display unit such as a display, the presentation unit 135 presents the information, which has been extracted by the extraction unit 134, to the user by transmitting the information about the second input data to an external device (for example, the user terminal 10).

The presentation unit 135 presents the information which is useful for the user such as a factor that has affected the result of the predetermined processing. For example, as illustrated in FIG. 5, the presentation unit 135 presents environmental information such as temperatures together with the second input data extracted by the extraction unit 134.

More specifically, the presentation unit 135 presents, together with the second input data, for example, the temperature or humidity of the case in which the predetermined processing has been executed with respect to the second input data. By virtue of this, the user can obtain useful information about, for example, failure causes of the processing since the temperature and humidity of the case in which the predetermined processing has been executed with respect to the data (second input data) input to the model in the past can be compared with the execution data (first input data) of the present time.

The presentation unit 135 may present the label attached to the second input data together with the second input data. For example, the presentation unit 135 presents the execution result of the case, in which the second input data has been input in the past, to the user.

Furthermore, based on the label-attached second input data extracted by the extraction unit 134, the presentation unit 135 may present the label and the information about the correlativity with the variable included in the second input data. For example, as illustrated in FIG. 5, the presentation unit 135 presents the labels and the variables (temperatures in the example of FIG. 5) which can be factors of the labels such as the temperatures and grasp success rates. By virtue of this, the user can easily specify the factor of the execution result.

The presentation unit 135 may present, together with the second input data extracted by the extraction unit 134, an index value indicating the influence of the second input data on the learning of the learning model. Specifically, the presentation unit 135 presents the value of LOSS of the extracted second input data. By virtue of this, the user can understand the information about the extracted second input data that shows the magnitude of the influence of the data on the model.

If the plural pieces of second input data are statistically sorted by the extraction unit 134, the presentation unit 135 may present the plural pieces of second input data, which have been sorted by the extraction unit 134.

The update unit 136 executes update processing of the model. For example, via the user terminal 10, the update unit 136 receives a request to delete particular learning data and a request to lower the importance degree in learning. Then, the update unit 136 updates the learning data based on the received request and relearn the model based on the updated learning data.

The update unit 136 may carry out update processing of automatically optimizing the model without receiving any request from the user. For example, the update unit 136 may delete, from the leaning data, the data to which a label inconsistent with that of the first input data is attached among the second input data extracted by the extraction unit 134 and update the learning model by using the learning data after the deletion.

For example, the learning data 25 to which an inconsistent label is attached even though both of the input and the output are similar to those of the execution data 20 as illustrated in FIG. 1 has a high possibility of adversely affecting execution of the predetermined processing (more specifically, the model). Therefore, the update unit 136 can optimize the model without receiving any request from the user by automatically deleting the data to which the label inconsistent with the first input data is attached from the learning data and updating the learning model by using the learning data after the deletion.

[1-4. Procedure of Information Processing According to First Embodiment]

Figure 10:
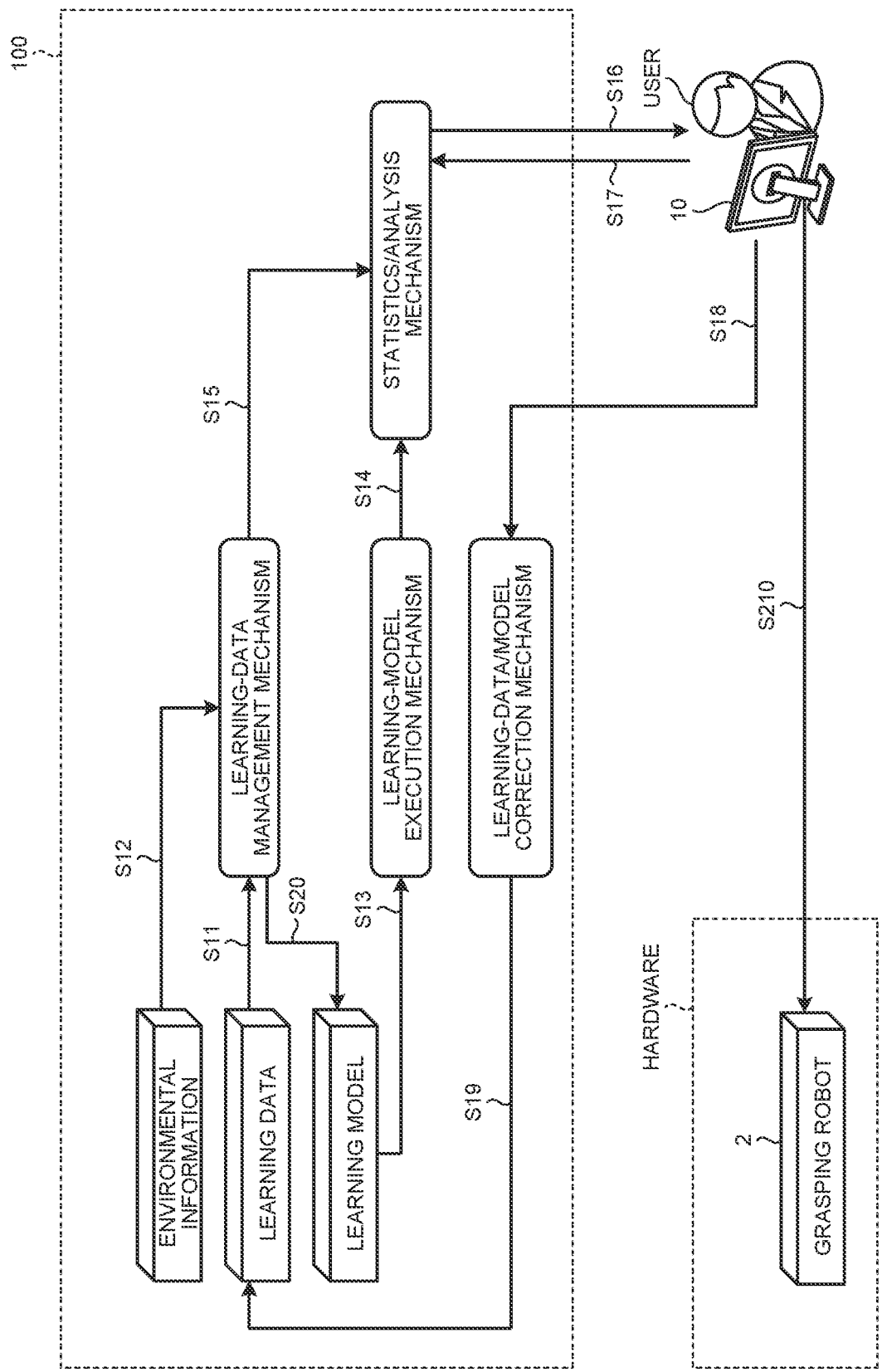
FIG. 10 is a diagram illustrating the outlines of information processing according to the first embodiment of the present disclosure.

Next, a procedure of information processing according to the first embodiment will be described by using FIG. 10 to FIG. 15. First, outlines of a flow of the information processing according to the first embodiment of the present disclosure will be described by using FIG. 10. FIG. 10 is a diagram illustrating the outlines of the information processing according to the first embodiment of the present disclosure.

FIG. 10 schematically illustrates the flow of the information processing executed by the information processing device 100 and the relations between the information processing device 100, the user terminal 10, and the grasping robot 2. As illustrated in FIG. 10, the information processing device 100 executes the information processing mainly based on four mechanisms (functions). For example, the learning unit 131 illustrated in FIG. 7 corresponds to a learning-data management mechanism illustrated in FIG. 10. The acquisition unit 132 illustrated in FIG. 7 corresponds to a learning-model execution mechanism illustrated in FIG. 10. The analysis unit 133, the extraction unit 134, and the presentation unit 135 illustrated in FIG. 7 correspond to a statistics/analysis mechanism illustrated in FIG. 10. The update unit 136 illustrated in FIG. 7 corresponds to a learning-data/model correction mechanism illustrated in FIG. 10.

As illustrated in FIG. 10, the information processing device 100 manages the learning data and accompanying environmental information by the learning-data management mechanism (Step S11 and Step S12). The information processing device 100 controls execution of the learning model by using the learning model in the learning-model execution mechanism (Step S13) and obtains execution results.

The information processing device 100 carries out statistics and analysis processing of the execution results in the statistics/analysis mechanism (Step S14). In this process, the information processing device 100 acquires the learning data used in model generation (Step S15) and extracts the learning data or the like similar to the data (first input data) input in execution of the model. Then, the information processing device 100 transmits the extracted information to the user terminal 10 and presents the information to the user (Step S16).

Based on the presented information, the user requests re-analysis for obtaining further detailed information (Step S17) and/or transmits a request for deleting the extracted learning data (Step S18).

The information processing device 100 updates the learning data in the learning-data/model correction mechanism (Step S19). Then, the information processing device 100 updates the learning model based on the updated learning data (Step S20). The user executes a request or order to incorporate the updated learning model in the hardware (grasping robot 2) (Step S210).

Figure 11:
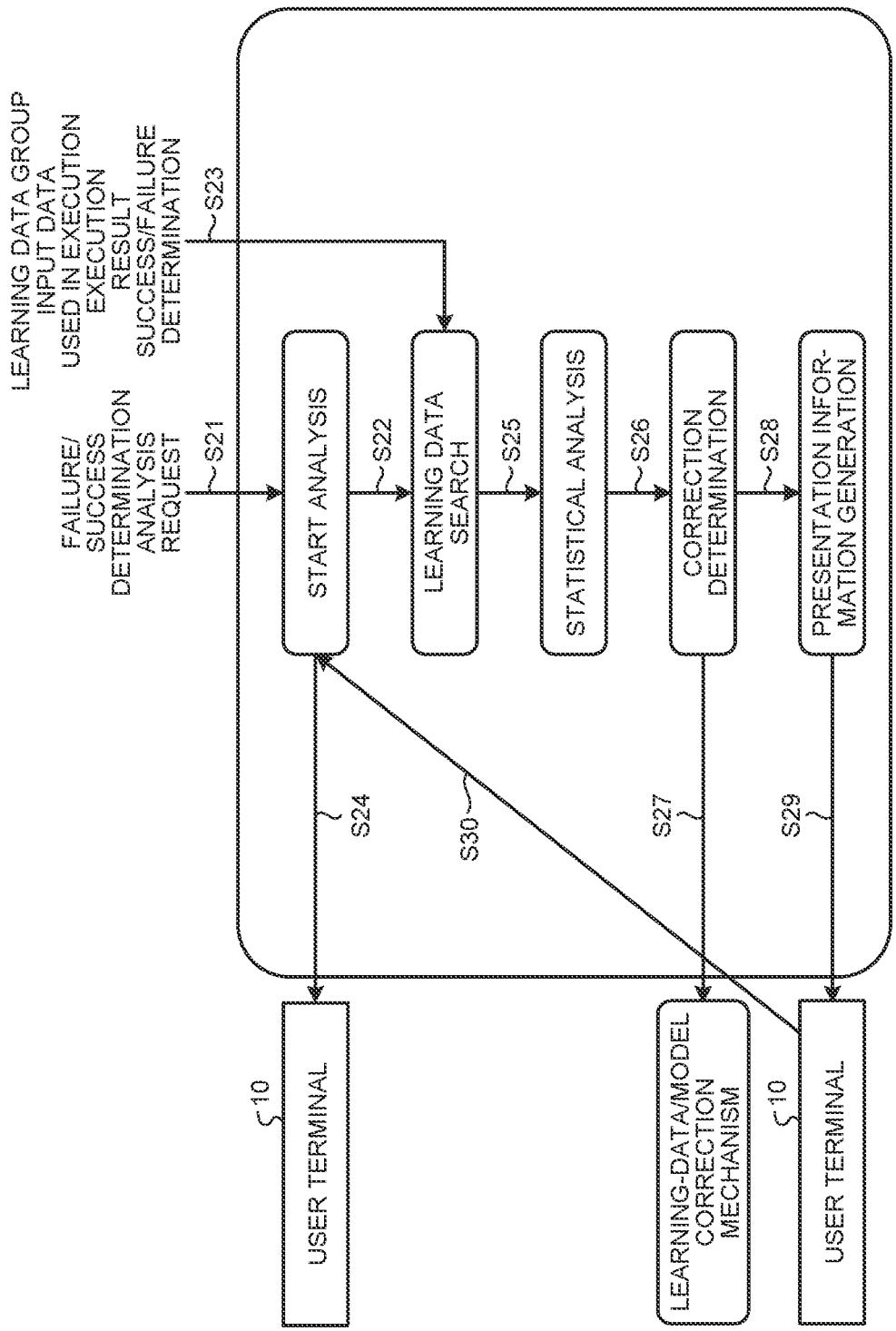
FIG. 11 is a diagram illustrating outlines of analysis processing according to the first embodiment of the present disclosure.

Next, details of the processing executed by the statistics/analysis mechanism illustrated in FIG. 10 will be described in detail by using FIG. 11. FIG. 11 is a diagram illustrating outlines of the analysis processing according to the first embodiment of the present disclosure.

As illustrated in FIG. 11, the information processing device 100 starts the analysis processing (Step S22) by being triggered by a failure/success determination of the processing executed based on the first input data (for example, a fact that the processing has failed) or an analysis request from the user (Step S21).

The information processing device 100 acquires the data required for the analysis (Step S23) such as learning data groups, the input data used in execution (first input data), execution results (output data, etc.), and success/failure determinations (labels). Then, the information processing device 100 searches for learning data, extracts similar learning data, and presents the information to the user terminal 10 (Step S24).

The information processing device 100 statistically analyzes the search results (Step S25) and determines, for example, whether there is inappropriate data as learning data or not (Step S26). With respect to the data which is inappropriate as learning data, the information processing device 100 takes a measure such as transmitting the data to the learning-data correction mechanism and deleting the data from the learning data group (Step S27).

The information processing device 100 carries out presentation information generation processing based on the information which has undergone statistics (Step S28). For example, the information processing device 100 carries out generation processing of a message or a graph to be presented to the user based on, for example, the correlativity between the execution results and temperatures. This processing may be carried out by being triggered by a request from the user.

The information processing device 100 transmits the generated presentation information to the user terminal 10 (Step S29). Then, if a request from the user who has browsed the presentation information to carry out further analysis of information is received (Step S30), the information processing device 100 carries out re-analysis of the information.

Figure 12:
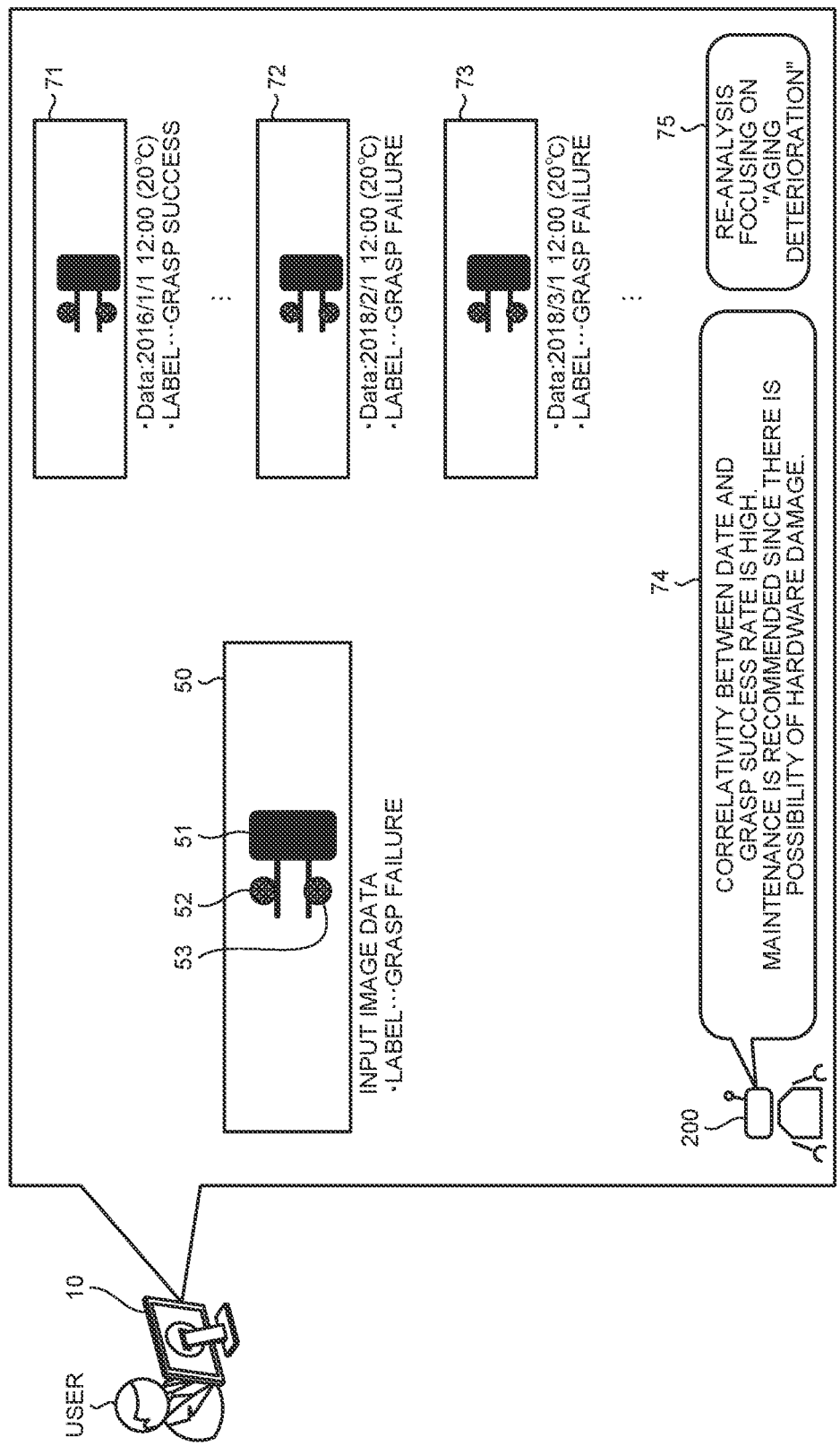
FIG. 12 is a diagram (1) illustrating re-analysis processing according to the first embodiment of the present disclosure.
Figure 13:
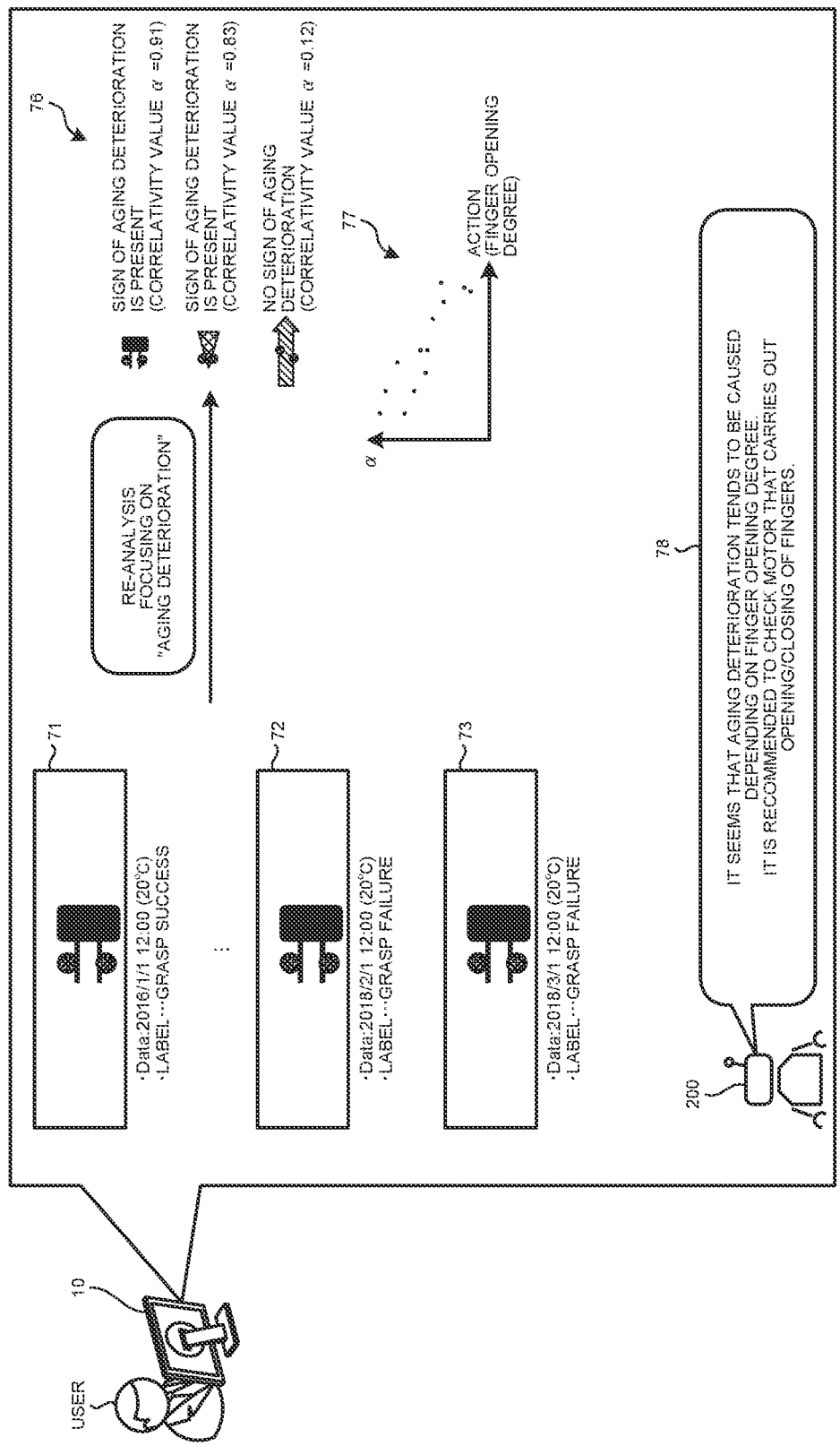
FIG. 13 is a diagram (2) illustrating the re-analysis processing according to the first embodiment of the present disclosure.

Herein, the re-analysis of information will be described by using FIG. 12 to FIG. 14. FIG. 12 is a diagram (1) illustrating re-analysis processing according to the first embodiment of the present disclosure. FIG. 12 illustrates an example in which execution result data 71, execution result data 72, and execution result data 73 are extracted with respect to execution data 50 and presented to the user.

The input data and the output data of the execution result data 71, the execution result data 72, and the execution result data 73 illustrated in FIG. 12 are extremely similar to the execution data 50. FIG. 12 illustrates the example in which the information processing device 100 presents three pieces of the execution result data. However, in practice, the information processing device 100 is assumed to carry out comparative verification between execution result data, which is more than three pieces, and the execution data 50.

In the example illustrated in FIG. 12, the information processing device 100 is assumed to have verified the correlativity between execution results (labels) and environmental information of predetermined processing. Then, the information processing device 100 determines that a significant correlation has been found between date and the labels. In this case, the information processing device 100 determines that a factor affecting the labels is "date" and generates a message 74 showing that fact. For example, the information processing device 100 generates the message 74 including an advice to the user such as "The correlativity between date and grasp success rates is high. Maintenance is recommended since there is a possibility of hardware damage." and presents the message to the user.

At this point, the information processing device 100 may present, to the user, a factor(s) related to the execution results and a proposal for carrying out re-analysis related to the factor. For example, the information processing device 100 sees the factor and definition information, etc. of re-analysis associated with the factor and gives a predetermined proposal to the user. For example, if it is determined that "date" is the factor that affects the grasp success rate, the information processing device 100 proposes re-analysis related to "aging deterioration" of hardware to the user.

For example, the information processing device 100 displays a button 75 for receiving re-analysis together with the presentation information (for example, the message 74) showing that the date is the factor affecting the execution results. The button 75 is a button showing, for example, a request to carry out "re-analysis focusing on "aging deterioration"". If the re-analysis is to be requested, the user selects the button 75.

The processing of the re-analysis of the case in which it is requested by the user will be described by using FIG. 13. FIG. 13 is a diagram (2) illustrating the re-analysis processing according to the first embodiment of the present disclosure. FIG. 13 illustrates an example of the information presented to the user when the information processing device 100 carries out re-analysis related to aging deterioration.

For example, if re-analysis related to aging deterioration is requested, the information processing device 100 calculates the correlativity of the grasp results of objects shown in the execution result data 71, etc. and grasp results of other objects with respect to data related to date. Then, the information processing device 100 presents, to the user, information 76 showing the correlativity between the various objects, the grasp results of the objects, and date. In the present disclosure, the index value showing the correlativity between the grasp results and arbitrary data is represented by a variable α. The correlativity value α has, for example, a numerical value of 0 to 1, wherein the closer it gets to 1, the higher the correlativity.

The information processing device 100 may also present, to the user, for example, a graph 77 illustrating the relation between the numerical values obtained from the movement results of the hardware and calculated correlativity. In the example of FIG. 13, the information processing device 100 presents the graph 77 illustrating the relation between finger opening degrees of the movement (actions) of the hardware and the correlativity showing grasp results. By virtue of this, the user can find out various information such as the tendency of aging deterioration (for example, the longer the operating time, the more likely grasp fails) and information that which part has problems due to usage along time.

The information processing device 100 may also generate presentation information related to the results of re-analysis as described above. For example, the information processing device 100 generates a message 78 presenting a check item such as "It seems that aging deterioration tends to be caused depending on the finger opening degree. It is recommended to check a motor that carries out opening/closing of fingers." to the user.

Next, details of the re-analysis processing executed by the information processing device 100 will be described by using FIG. 14. FIG. 14 is a diagram (3) illustrating the re-analysis processing according to the first embodiment of the present disclosure. In FIG. 14, a flow of processing in which the information processing device 100 carries out re-analysis and further generates presentation information based on the re-analysis is described.

Figure 14:
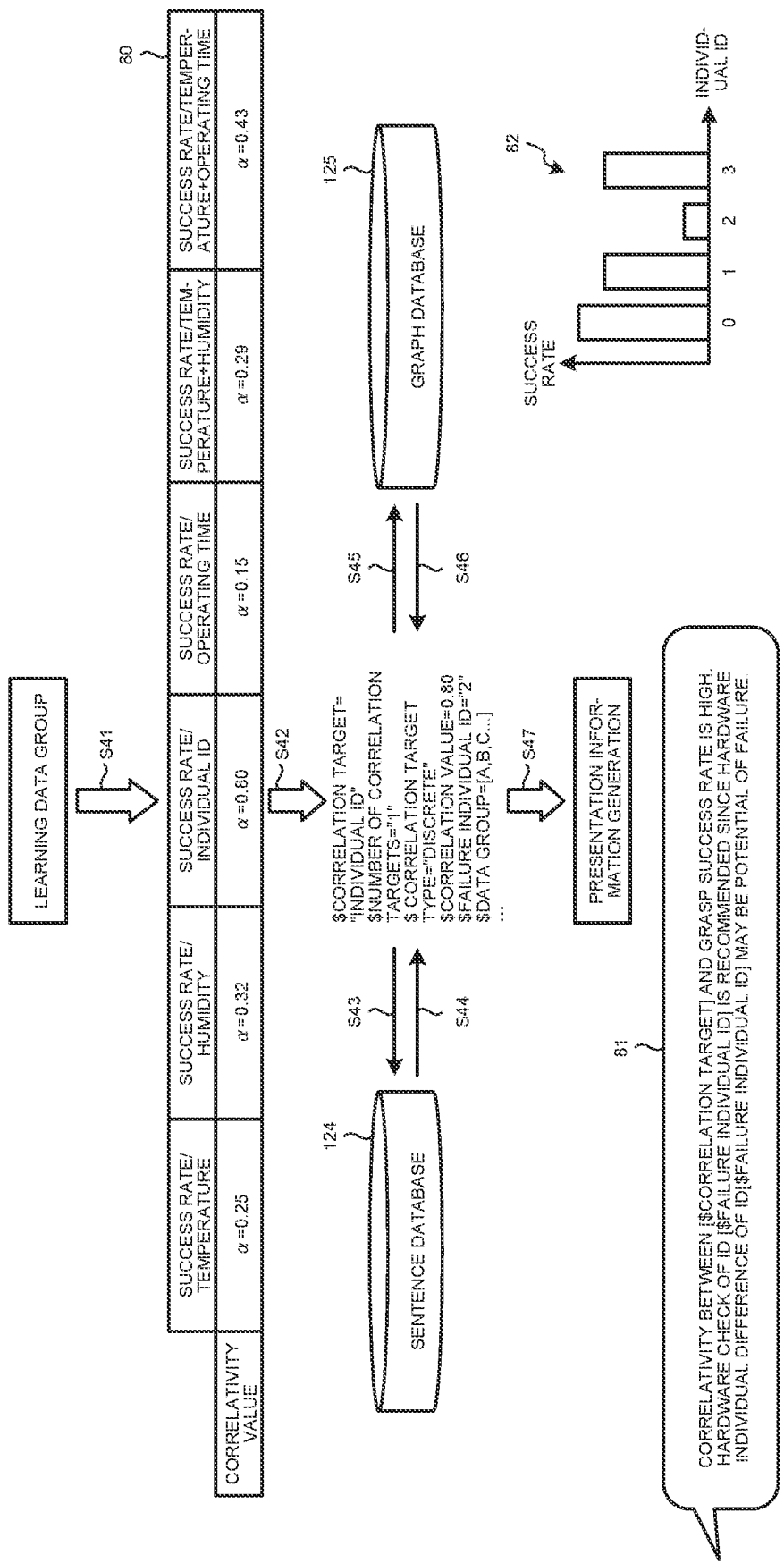
FIG. 14 is a diagram (3) illustrating the re-analysis processing according to the first embodiment of the present disclosure.

As illustrated in FIG. 14, the information processing device 100 sees learning data groups and calculates the correlativity between the results of predetermined processing and the data included in each learning data (Step S41). Then, the information processing device 100 generates a table 80 illustrating the relations between the results of the predetermined processing and the correlativity (correlativity value α) of the data included in each learning data.

The correlativity value α is calculated, for example, by incorporating a predetermined application programming interface (API) and executing the API. For example, the information processing device 100 executes the API and subjects the learning data groups (and execution result data groups) to clustering based on the feature amounts of input. In other words, the information processing device 100 groups the input data (shapes of objects in the example of FIG. 14) having high similarity degrees. Then, the information processing device 100 subjects each of the similar object clusters to statistical processing, thereby calculating the correlativity value α, which indicates the correlativity between the individual data such as environmental information and the attached label.

Then, if the correlativity value α exceeds a predetermined threshold value (for example, α>0.5), the information processing device 100 determines that the influence of the data on the processing result is large and generates the information for presenting this fact to the user.

For example, in the example illustrated in FIG. 14, among the information such as temperatures and humidity, the correlativity value α of the individual ID and the success rate exceeds the threshold value. Therefore, the information processing device 100 determines that the influence of the individual ID on the processing result is large and determines to generate presentation information about the individual ID (Step S42).

For example, the information processing device 100 generates presentation information to be presented to the user by inputting a predetermined variable(s) to a sentence database 124 and/or a graph database 125 in which a plurality of rules are defined.

In the example of FIG. 14, the information processing device 100 inputs various information such as information that a variable "correlation target" is "individual ID" and information that a variable "the number of correlation targets" is "1" to the sentence database 124 (Step S43). For example, the sentence database 124 retains messages in which input fields of some of variables (in FIG. 14, "correlation target", "failure individual ID", etc.) are blanks like a message 81. The information processing device 100 acquires a message which can be presented to the user by inputting the values of the variables to these input fields (Step S44).

Similarly, the information processing device 100 inputs the values of the variables to the graph database 125 (Step S45). By virtue of this, the information processing device 100 acquires a graph 82 or the like generated based on the values of the variables (Step S46). The information processing device 100 generates the presentation information by this processing (Step S47).

In this manner, the information processing device 100 can appropriately present the data having correlativity with the failure factor of the processing results, a measure that can be taken by the user, etc. by subjecting the accumulated learning data groups to re-analysis. The user can correct the learning data or check the hardware based on the presented information.

Figure 15:
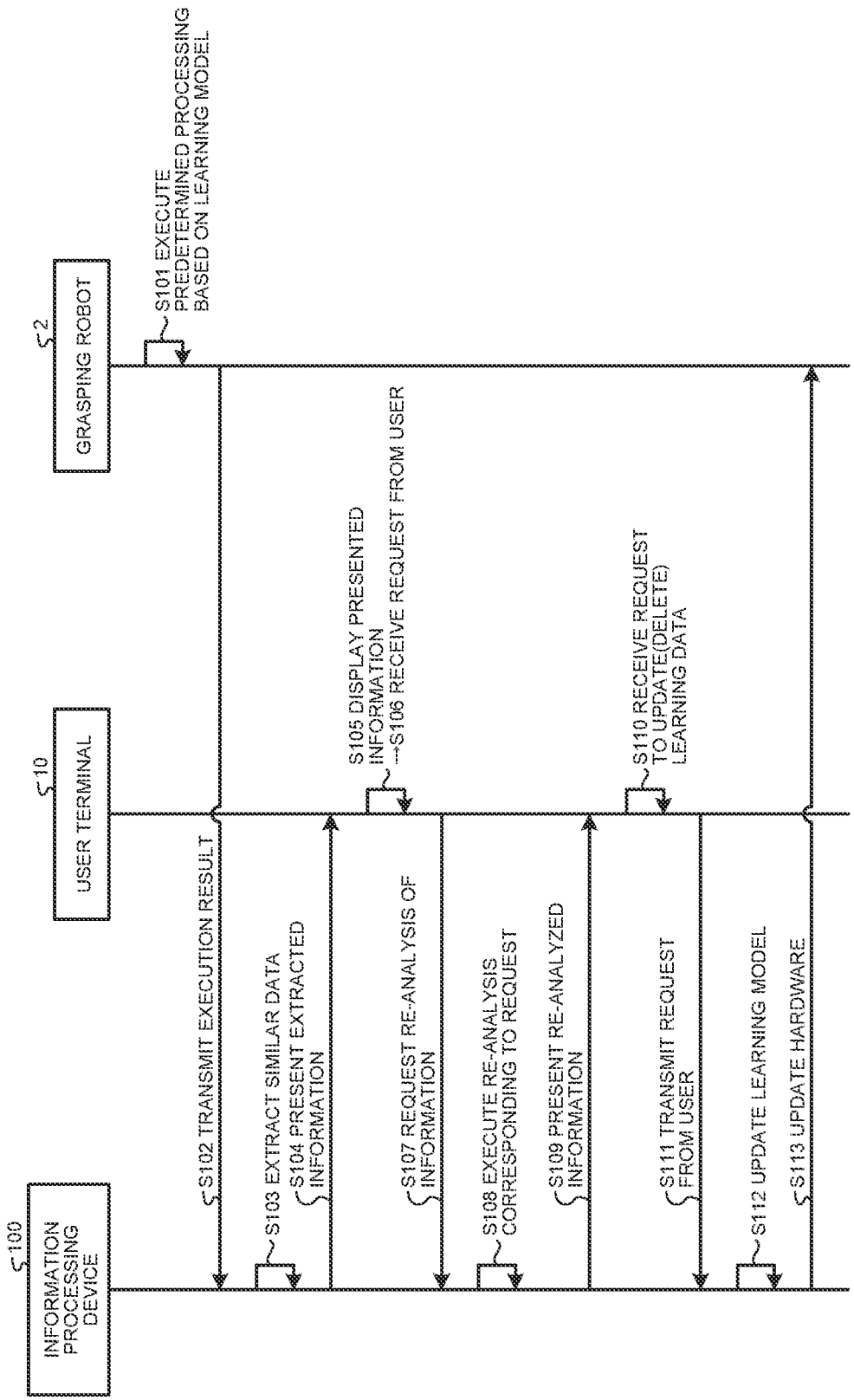
FIG. 15 is a sequence diagram illustrating a flow of the information processing according to the first embodiment of the present disclosure.

Next, a flow of the information processing in an entire information processing system 1 will be described by using FIG. 15. FIG. 15 is a sequence diagram illustrating the flow of the information processing according to the first embodiment of the present disclosure.

First, the grasping robot 2 executes predetermined processing based on a learning model (Step S101). Then, the grasping robot 2 transmits various information such as execution results of the processing and environmental information obtained in the execution to the information processing device 100 (Step S102).

The information processing device 100 extracts the data similar to, for example, input data used in the execution (Step S103). Subsequently, the information processing device 100 presents (transmits) the extracted data to the user terminal 10 (Step S104).

The user terminal 10 displays the presented information (Step S105). The user terminal 10 receives a request of re-analysis from the user who has browsed the displayed information (Step S106). The user terminal 10 requests the information processing device 100 to carry out re-analysis of information in accordance with the request received from the user (Step S107).

The information processing device 100 executes the re-analysis corresponding to the request (Step S108). Then, the information processing device 100 presents the re-analyzed information to the user terminal 10 (Step S109).

The user terminal 10 receives, for example, a request to update (delete) the learning data from the user who has browsed the re-analyzed information (Step S110). In accordance with the request received from the user, the user terminal 10 transmits a request to, for example, update the learning data to the information processing device 100 (Step S111).

The information processing device 100 updates the learning data, then carries out relearning with the updated learning data, and updates the learning model (Step S112). Then, the information processing device 100 updates the hardware based on the updated learning model (Step S113).

The above described flow of the processing shows an example, and the processing by the information processing system 1 is not always required to be carried out along the flow of FIG. 15, but may be variously changed. For example, the user may request update of the learning data after Step S105 or may carry out update of the hardware via the user terminal 10.

[1-5. Modification Example of First Embodiment]

The above described processing according to the first embodiment may be carried out in various different forms (modification examples).

Figure 16:
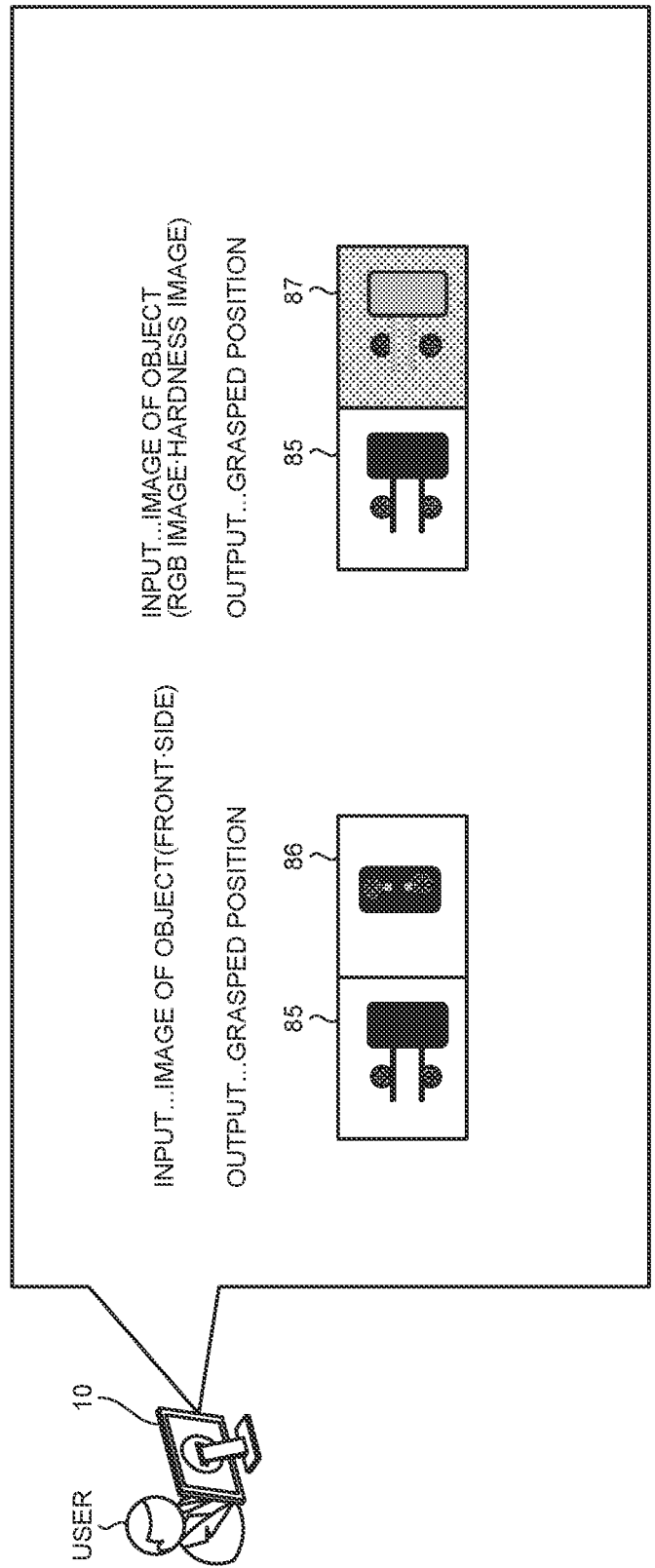
FIG. 16 is a diagram (1) illustrating an example of information processing according to a modification example of the first embodiment.

For example, the information processing device 100 may present plural pieces of input data as input data instead of presenting a single piece of image data. This point will be described by using FIG. 16. FIG. 16 is a diagram (1) illustrating an example of information processing according to a modification example of the first embodiment.

FIG. 16 illustrates an example in which the information processing device 100 presents a front-view and side-view images of object images to the user as input data. As illustrated in FIG. 16, the user can browse an image 86, which is captured from a side of the object, in addition to an image 85, which is captured from the front of the object. By virtue of this, the user can check the points grasped by the grasping robot 2 from multiple viewpoints. Although illustration in FIG. 16 is omitted, the information processing device 100 may present learning data having input data similar to the image 85 and the image 86 together with the image 85 and the image 86.

FIG. 16 illustrates the example in which the information processing device 100 presents an RGB image and a hardness image of object images to the user as input data. As illustrated in FIG. 16, the user can browse an image 87, which has been acquired via a sensor that measures hardness of objects, in addition to an image 85, which has captured the object by normal color tones. By virtue of this, the user can check the points grasped by the grasping robot 2 and carry out analysis about the degree of the hardness of the object or about appropriateness of the degree of hardness of the grasped part. Although illustration in FIG. 16 is omitted, the information processing device 100 may present learning data having input data similar to the image 85 and the image 87 together with the image 85 and the image 87. In this case, the input data similar to the image 87 may be an object having similar hardness of the elements constituting the object. The information processing device 100 is not limited to acquiring the image illustrating hardness, etc., but may acquire, for example, a depth image of the object.

Figure 17:
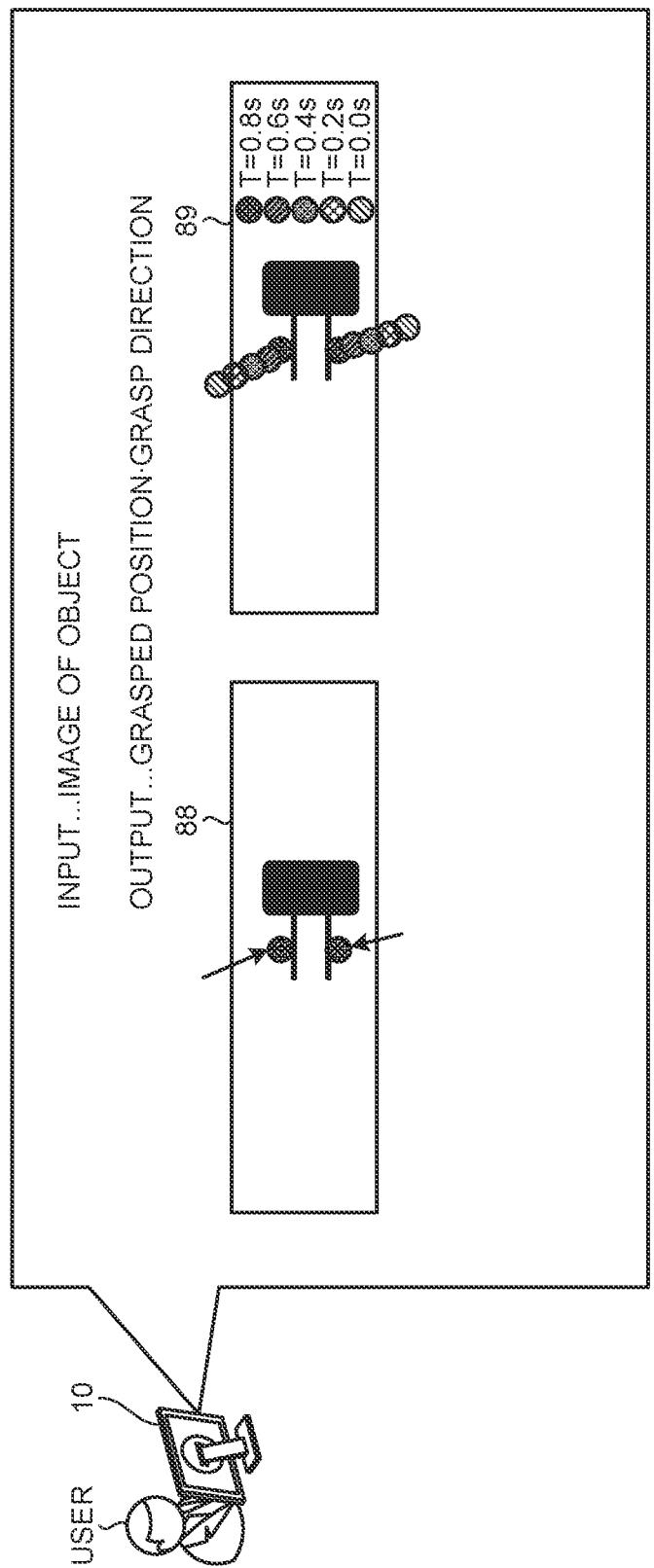
FIG. 17 is a diagram (2) illustrating an example of information processing according to a modification example of the first embodiment.

Also, the information processing device 100 may present, for example, a direction and movement history of grasping instead of only presenting grasp points as output data. This point will be described by using FIG. 17. FIG. 17 is a diagram (2) illustrating an example of information processing according to a modification example of the first embodiment.

FIG. 17 illustrates an example in which the information processing device 100 presents execution data 88, which has a trajectory by which the grasping robot 2 has grasped the object as output data, to the user. Also, the information processing device 100 may present execution data 89, which has data storing a movement history of grasping of the object by the grasping robot 2 in time series as output data, to the user.

In this manner, the information processing device 100 is not limited to presenting only the output value at a certain moment as the output data, but may present the data, which has captured the output data obtained based on movement of the hardware in time series, to the user. By virtue of this, the user can more precisely understand what kind of movement has been carried out by the hardware. The information processing device 100 is not limited to acquiring a two-dimensional movement history, but may acquire, for example, a three-dimensional movement history as the output data.

The first embodiment has shown the example in which the input data is generated based on a sensor such as a camera attached to the grasping robot 2. However, the input data may be generated by various methods.

For example, the input data may be generated by capturing images of the movement of the grasping robot 2 by the user himself/herself. Also, the input data may be generated based on the data automatically collected by a robot, which is different from the grasping robot 2.

In the first embodiment, the example in which the information processing device 100 acquires data such as temperatures and humidity as environmental information has been shown. However, the information processing device 100 may acquire various data such as luminous intensity (degree of brightness), a time slot in which the movement is executed, and the height at which the processing is executed as the environmental information. The information processing device 100 may also analyze the correlativity between the acquired various data and processing results.

2. Second Embodiment

Next, a second embodiment will be described. In the first embodiment, the example in which the information processing device 100 calculates the similarity degree between the input data of the grasp processing of the grasping robot 2 and the input data included in, for example, the learning data has been shown. However, the information processing device 100 may carry out processing of calculating similarity degrees like those described above not only in grasp processing, but also in various processing. This point will be described by using FIG. 18 and FIG. 19.

Figure 18:
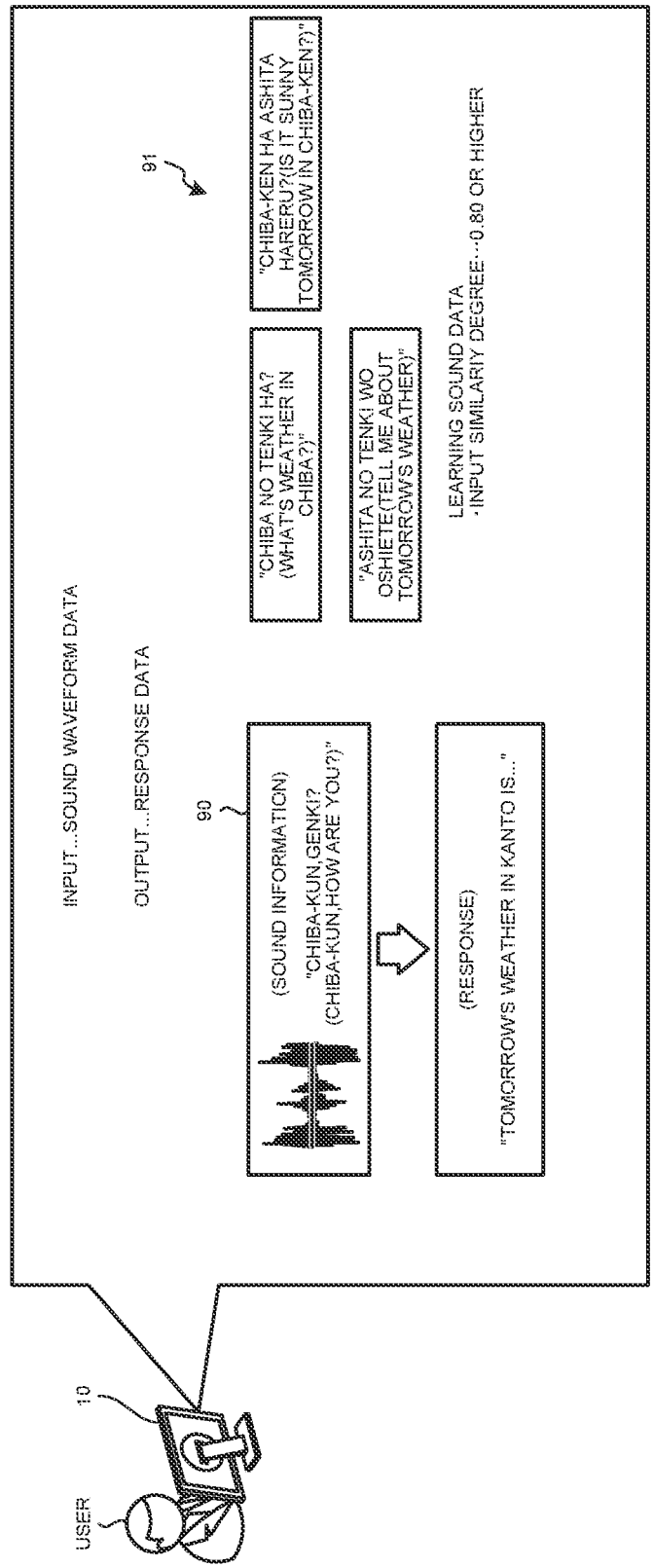
FIG. 18 is a diagram (1) illustrating outlines of information processing according to the second embodiment of the present disclosure.

FIG. 18 is a diagram (1) illustrating outlines of information processing according to the second embodiment of the present disclosure. FIG. 18 illustrates an example in which the information processing device 100 generates a model about sound automatic responses and responds to a sound input to the model. Although illustration in FIG. 18 is omitted, hardware according to the second embodiment is, for example, a so-called smart speaker which makes automatic responses by sound.

The example illustrated in FIG. 18 illustrates that the user inputs a sound 90 "Chiba-kun Genki? (Chiba-kun, how are you?)" to the hardware and a response "Tomorrow's weather in Kanto is . . . " is made with respect to the input sound 90. In this case, the user transmits the fact that a desired response has not been obtained to the information processing device 100 via the user terminal 10. The information processing device 100 receives the information and extracts learning data similar to the first input data (in the example of FIG. 18, the sound 90 having sound waveforms of "Chiba-kun Genki? (Chiba-kun, how are you?)").

For example, as well as the first embodiment, the information processing device 100 calculates the similarity degrees between the feature amount of the input data included in each learning data and the feature amount of the first input data. Then, the information processing device 100 extracts, for example, the learning data including the input data having a high calculated similarity degree.

In the example of FIG. 18, the information processing device 100 extracts a learning data group 91, which includes plural pieces of learning data similar to the first input data (for example, having a similarity degree of 0.80 or higher) and presents that to the user. When the user sees each of the input data of the presented learning data group 91, the user can assume, for example, that the speech "Chiba-kun" has been erroneously recognized as "Chiba-ken (Chiba Prefecture)" and that the speech "Genki? (How are you?)" has been erroneously recognized as "Tenki (weather)".

Also, the information processing device 100 can provide more useful information to the user by presenting the similar data together with past execution data, labels of the learning data, and other environmental information. This point will be described by using FIG. 19.

Figure 19:
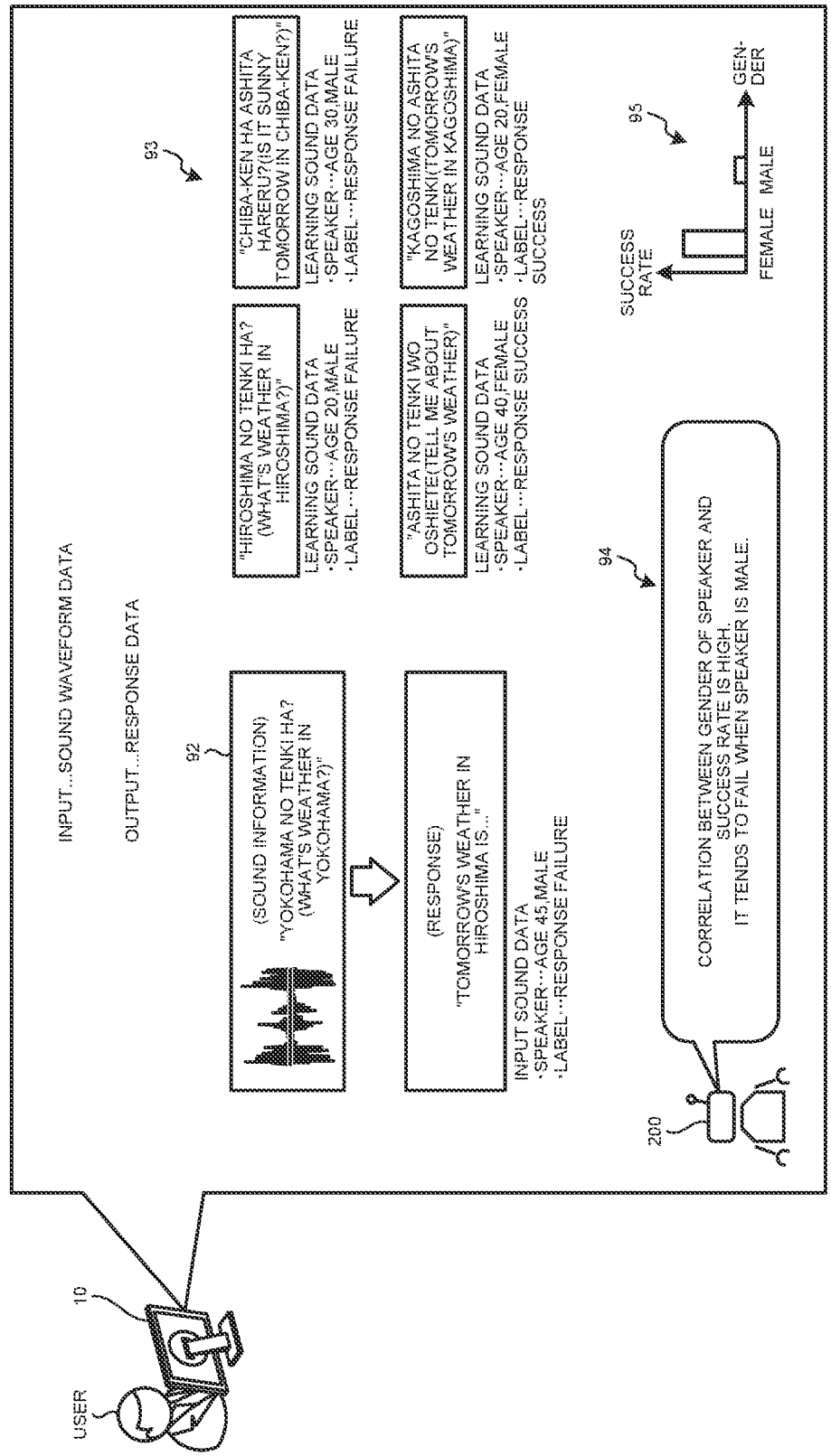
FIG. 19 is a diagram (2) illustrating outlines of information processing according to a second embodiment of the present disclosure.

FIG. 19 is a diagram (2) illustrating outlines of information processing according to the second embodiment of the present disclosure. FIG. 19 illustrates an example in which the information processing device 100 extracts a learning data group 93 similar to a sound 92 "Yokohama no tenki ha? (What's the weather in Yokohama?)" of the user.

When a response "Tomorrow's weather in Hiroshima is . . . " is obtained from the hardware with respect to the sound 92 "Yokohama no tenki ha? (What's the weather in Yokohama?)", the user attaches a label "response failure" since the response is failure. Triggered by attachment of the label "response failure", the information processing device 100 starts processing of extracting input data similar to the first input data.

In the example of FIG. 19, the information processing device 100 extracts the learning data group 93 and presents that to the user. As illustrated in FIG. 19, each data included in the learning data group 93 has a label and attribute information (gender, age, etc.) of a speaker.

When the user sees the presented learning data group 93, the user can assume that, for example, the speech "Yokohama" has been erroneously recognized as "Hiroshima" or "Kagoshima".

As well as the first embodiment, the information processing device 100 may calculate the correlativity between the labels and environmental information and generate presentation information based on the calculated information. For example, the information processing device 100 calculates the correlativity between the label attached to each data of the learning data group 93 and the environmental information of each data by predetermined statistical processing. In the example of FIG. 19, the information processing device 100 determines that the labels (success rates of responses) and the gender of the speaker have significant correlation in the data group (learning data group 93) similar to the first input data.

In this case, the information processing device 100 generates a message 94 such as "The correlation between the gender of the speaker and the success rate is high. It tends to fail when the speaker is male." that tells the correlativity between the label and the gender and presents that to the user.

Alternatively, the information processing device 100 may generate a graph 95 illustrating the correlativity between the labels and the gender and present that to the user.

As described above, as well as the first embodiment, the information processing device 100 can execute processing of extracting and presenting similar input data for an event having logs in predetermined processing. In other words, the information processing device 100 can present the information useful for the user not only for grasp processing, but in various fields such as sound response processing in which machine learning is used.

In the second embodiment, the information processing device 100 may generate the presentation information by using various data such as the place where the speech is made, the birthplace of the speaker, the distance between the speaker and the hardware, the direction of the face of the speaker, feature amounts, and LOSS and is not limited to using the gender, age, etc. of the user.

3. Other Embodiments

The processing according to each of the above described embodiments may be carried out in various different forms other than the above described embodiments.

For example, among the processing described in the above described embodiments, all or part of the processing described to be automatically carried out can be also manually carried out, or all or part of the processing described to be manually carried out can be also automatically carried out by a publicly known method. Other than that, the processing procedures, specific names, and information including various data or parameters illustrated in above described document or drawings can be arbitrarily changed unless otherwise specifically stated. For example, the various information illustrated in the drawings are not limited to the information illustrated in the drawings.

Constituent elements of each device illustrated in drawings are functional ideas, and are not necessarily physically required to be formed like the illustration in the drawings. In other words, specific forms of dispersion/integration of devices are not limited to those illustrated in the drawings, but all or part thereof can be functionally or physically dispersed/integrated to be formed in an arbitrary units depending on various load, usage situation, etc.

Also, above described embodiments and modification examples can be appropriately combined within the range in which processing contents do not conflict with each other.

The effects described in the present specification are merely examples and are not limitative, and other effects may be exerted.

4. Hardware Configuration

Figure 20:
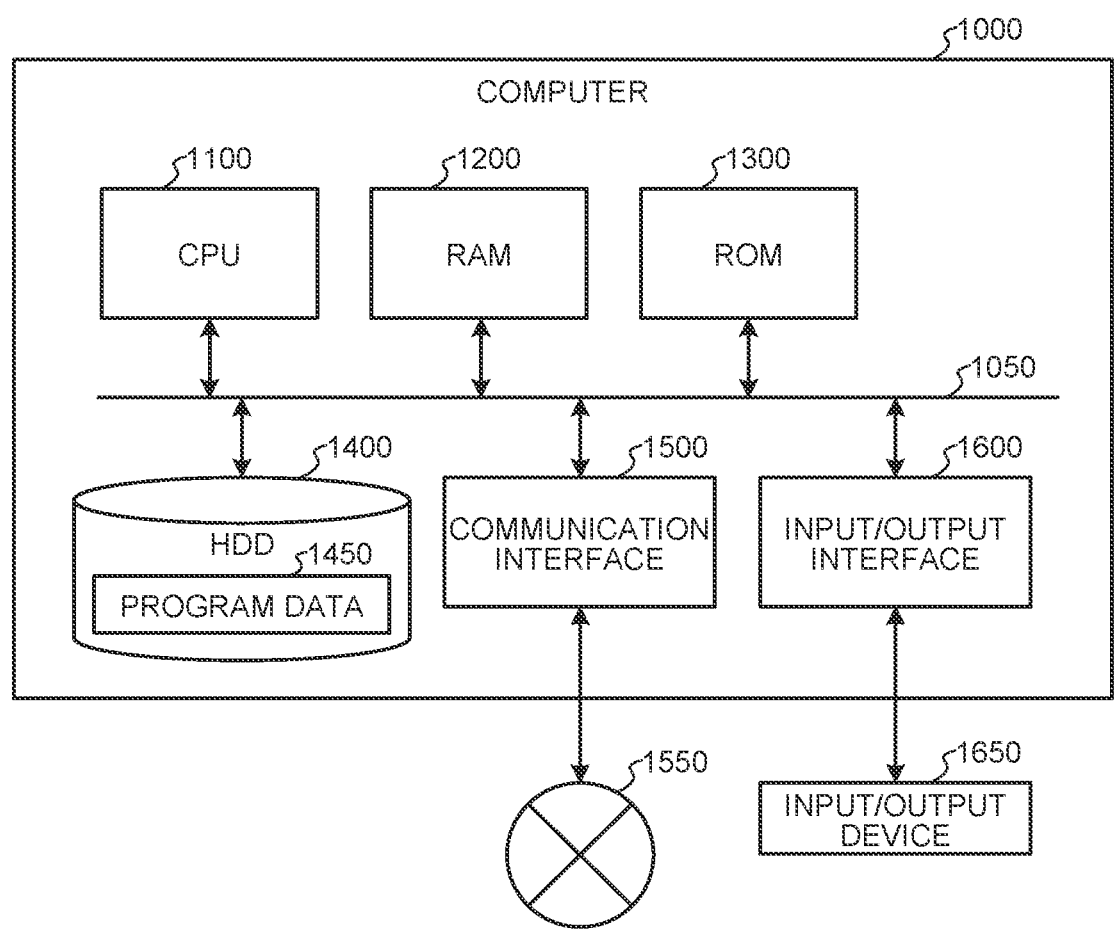
FIG. 20 is a hardware configuration diagram illustrating an example of a computer which realizes functions of the information processing device.

Information equipment such as the information processing device 100, the grasping robot 2, and the user terminal 10 according to the above described embodiments are realized, for example, by a computer 1000 having a configuration as illustrated in FIG. 20. Hereinafter, the information processing device 100 according to the first embodiment will be used as an example for description. FIG. 20 is a hardware configuration diagram illustrating an example of a computer 1000, which realizes functions of the information processing device 100. The computer 1000 has a CPU 1100, a RAM 1200, a read only memory (ROM) 1300, a hard disk drive (HDD) 1400, a communication interface 1500, and an input/output interface 1600. Each part of the computer 1000 is connected by a bus 1050.

The CPU 1100 operates based on programs stored in the ROM 1300 or the HDD 1400 and controls each part. For example, the CPU 1100 deploys the programs, which are stored in the ROM 1300 or the HDD 1400, in the RAM 1200 and executes processing corresponding to the various programs.

The ROM 1300 stores, for example, a boot program such as Basic Input Output System (BIOS), which is executed by the CPU 1100 upon startup of the computer 1000, and a program dependent on hardware of the computer 1000.

The HDD 1400 is a computer-readable recording medium which non-temporarily records, for example, programs executed by the CPU 1100 and data used by the programs. Specifically, the HDD 1400 is a recording medium which records the information processing program according to the present disclosure serving as an example of program data 1450.

The communication interface 1500 is an interface for connecting the computer 1000 to an external network 1550 (for example, the Internet). For example, the CPU 1100 receives data from other equipment and transmits the data generated by the CPU 1100 to other equipment via the communication interface 1500.

The input/output interface 1600 is an interface for connecting an input/output device 1650 and the computer 1000. For example, the CPU 1100 receives data from an input device such as a keyboard or a mouse via the input/output interface 1600. Also, the CPU 1100 transmits data to an output device such as a display, a speaker, or a printer via the input/output interface 1600. Also, the input/output interface 1600 may function as a media interface, which reads a program or the like recorded in a predetermined recording medium (media). The media are, for example, optical recording media such as digital versatile discs (DVDs) and phase change rewritable disks (PDs), magnetooptical recording media such as magneto-optical disks (MOs), tape media, magnetic recording media, or semiconductor memories.

For example, if the computer 1000 functions as the information processing device 100 according to the first embodiment, the CPU 1100 of the computer 1000 realizes functions of the control unit 130, etc. by executing the information processing program loaded on the RAM 1200. Moreover, the HDD 1400 stores the information processing program according to the present disclosure and the data in the storage unit 120. The CPU 1100 reads the program data 1450 from the HDD 1400 to execute it, but may acquire these programs from other devices via the external network 1550 as another example.

The present technique can also employ following configurations.

(1) An information processing device comprising
    an acquisition unit configured to acquire first input data input when first output data is obtained in predetermined processing of obtaining output data with respect to input data;
    an extraction unit configured to extract second input data related to the first input data acquired by the acquisition unit based on a similarity degree between the first input data and each input history data, which is a history of input data of a case of past execution of the predetermined processing, from the input history data; and
    a presentation unit configured to present the second input data extracted by the extraction unit.

(2) The information processing device according to (1), wherein
    the extraction unit
    extracts, as the second input data, input history data having an output result similar to the first output data.

(3) The information processing device according to (1) or (2), wherein
the extraction unit
extracts, as the second input data, plural pieces of data including input history data having an output result similar to the first output data and input history data having an output result not similar to the first output data.
(4) The information processing device according to any one of (1) to (3), wherein
the extraction unit
preferentially extracts, as the second input data, data having a higher similarity degree with the first input data among the input history data.
(5) The information processing device according to any one of (1) to (4), wherein
the acquisition unit
acquires the first input data including environmental information of the predetermined processing in which the first output data is obtained,
the extraction unit
extracts the second input data including the environmental information, and
the presentation unit
presents the second input data together with the environmental information.
(6) The information processing device according to (5), wherein
the acquisition unit
acquires a temperature or humidity as the environmental information, and
the presentation unit
presents, together with the second input data, the temperature or humidity of a case in which the predetermined processing is executed with respect to the second input data.
(7) The information processing device according to any one of (1) to (6), wherein
the acquisition unit
acquires the first input data to which a label indicating a result of the predetermined processing is attached, and
the extraction unit extracts the second input data related to the first input data when the label attached to the first input data is a predetermined result designated in advance.
(8) The information processing device according to any one of (1) to (7), wherein
the acquisition unit
acquires the first input data to which a label indicating a result of the predetermined processing is attached,
the extraction unit
extracts the second input data to which the label is attached based on a similarity degree between the first input data and the input history data to which the label is attached, and
the presentation unit presents the label attached to the second input data together with the second input data.
(9) The information processing device according to (8), wherein
the presentation unit
presents information about correlativity between the label and a variable included in the second input data based on the second input data extracted by the extraction unit and attached with the label.
(10) The information processing device according to any one of (1) to (9), wherein
the acquisition unit
acquires the first input data input when the first output data is obtained from a predetermined learning model, and
the extraction unit
extracts the second input data from learning data used in generation of the learning model based on a similarity degree between the first input data and the learning data.
(11) The information processing device according to (10), wherein
the presentation unit
presents, together with the second input data extracted by the extraction unit, an index value indicating influence of the second input data on learning of the learning model.
(12) The information processing device according to (10) or (11), wherein
the acquisition unit
acquires the first input data to which a label indicating a result of the predetermined processing is attached, and
the extraction unit
extracts the second input data to which the label is attached based on the similarity degree between the first input data and the learning data to which the label is attached.
(13) The information processing device according to (12), further comprising
an update unit configured to delete, from the learning data, data to which a label inconsistent with the first input data is attached among the second input data extracted by the extraction unit and update the learning model by using the learning data after the deletion.
(14) The information processing device according to any one of (1) to (13), wherein
the extraction unit
statistically sorts plural pieces of the second input data based on a variable associated with the plural pieces of the second input data, and
the presentation unit
presents the plural pieces of the second input data sorted by the extraction unit.
(15) An information processing method, by a computer, comprising:
acquiring first input data input when first output data is obtained in predetermined processing of obtaining output data with respect to input data;
extracting second input data related to the acquired first input data based on a similarity degree between the first input data and each input history data, which is a history of input data of a case of past execution of the predetermined processing, from the input history data; and
presenting the extracted second input data.
(16) An information processing program for causing a computer to function as:
an acquisition unit configured to acquire first input data input when first output data is obtained in predetermined processing of obtaining output data with respect to input data;
an extraction unit configured to extract second input data related to the first input data acquired by the acquisition unit based on a similarity degree between the first input data and each input history data, which is a history of input data of a case of past execution of the predetermined processing, from the input history data; and a presentation unit configured to present the second input data extracted by the extraction unit.

REFERENCE SIGNS LIST

1 INFORMATION PROCESSING SYSTEM
2 GRASPING ROBOT
10 USER TERMINAL
100 INFORMATION PROCESSING DEVICE
110 COMMUNICATION UNIT
120 STORAGE UNIT
121 LEARNING-DATA STORAGE UNIT
122 EXECUTION-RESULT STORAGE UNIT
123 PRESENTATION-INFORMATION STORAGE UNIT
124 SENTENCE DATABASE
125 GRAPH DATABASE
130 CONTROL UNIT
131 LEARNING UNIT
132 ACQUISITION UNIT
133 ANALYSIS UNIT
134 EXTRACTION UNIT
135 PRESENTATION UNIT
136 UPDATE UNIT

The invention claimed is:

1. An information processing device, comprising:
circuitry configured to:
obtain first output data based on a specific process to obtain specific output data corresponding to specific input data;
acquire first input data based on the obtained first output data;
extract, based on a similarity degree between the first input data and each of a plurality of input history data items, second input data from the plurality of input history data items, wherein the plurality of input history data items corresponds to a history of the specific input data of a case of past execution of the specific process;
present the extracted second input data;
delete, based on the extracted second input data, from the plurality of input history data items, specific data which includes an inconsistent label corresponding to the first input data; and
update the plurality of input history data items based on the deleted specific data.

2. The information processing device according to claim 1, wherein the circuitry is further configured to:
extract, as the second input data, input history data from the plurality of input history data items, wherein the input history data have an output result similar to the first output data.

3. The information processing device according to claim 1, wherein the circuitry is further configured to:
extract, as the second input data, a plurality of pieces of data including first input history data and second input history data, wherein
the first input history data is from the plurality of input history data items,
the second input history data is from the plurality of input history data items,
the first input history data have a first output result similar to the first output data, and
the second input history data have a second output result not similar to the first output data.

4. The information processing device according to claim 1, wherein
the circuitry is further configured to preferentially extract, as the second input data, the specific data that have a higher similarity degree with the first input data, and the specific data is from the plurality of input history data items.

5. The information processing device according to claim 1, wherein the circuitry is further configured to:
acquire the first input data that includes environmental information of the specific process,
extract the second input data that includes the environmental information, and
present the second input data with the environmental information.

6. The information processing device according to claim 5, wherein the circuitry is further configured to:
acquire at least one of a temperature or humidity as the environmental information, and
present, with the second input data, at least one of the temperature or the humidity of the case of past execution of the specific process for the second input data.

7. The information processing device according to claim 1, wherein the circuitry is further configured to:
acquire the first input data which includes a label that indicates a result of the specific process, and
extract the second input data based on determination that the label indicates a specific result.

8. The information processing device according to claim 1, wherein the circuitry is further configured to:
acquire the first input data which includes a label that indicates a result of the specific process,
extract, based on a similarity degree between the first input data and each of the plurality of input history data items which includes the label, the second input data which includes the label, and
present the label with the second input data.

9. The information processing device according to claim 8, wherein the circuitry is further configured to:
the circuitry is further configured to present, based on the extracted second input data, information that indicates correlativity between the label and a variable, and
the extracted second input data includes the variable.

10. The information processing device according to claim 1, wherein the circuitry is further configured to:
obtain the first output data based on a specific learning model,
acquire the first input data based on the obtained first output data, and
extract, based on a similarity degree between the first input data and learning data, the second input data from the learning data of the specific learning model.

11. The information processing device according to claim 10, wherein the circuitry is further configured to:
present, with the extracted second input data, an index value that indicates influence of the second input data on the specific learning model.

12. The information processing device according to claim 10, wherein the circuitry is further configured to:
acquire the first input data which includes a label that indicates a result of the specific process, and
extract, based on the similarity degree between the first input data and the learning data which includes the label, the second input data which includes the label.

13. The information processing device according to claim 1, wherein the circuitry is further configured to:
- statistically sort a plurality of pieces of the second input data based on a variable corresponding to the plurality of pieces of the second input data, and
- present the sorted plurality of pieces of the second input data.

14. An information processing method, comprising:
- obtaining first output data based on a specific process to obtain specific output data corresponding to specific input data;
- acquiring first input data based on the obtained first output data;
- extracting, based on a similarity degree between the first input data and each of a plurality of input history data items, second input data from the plurality of input history data items, wherein the plurality of input history data items corresponds to a history of the specific input data of a case of past execution of the specific process;
- presenting the extracted second input data;
- deleting, based on the extracted second input data, from the plurality of input history data items, specific data which includes an inconsistent label corresponding to the first input data; and
- updating the plurality of input history data items based on the deleted specific data.

15. A non-transitory computer-readable medium having stored thereon, computer-executable instructions which, when executed by a computer, cause the computer to execute operations, the operations comprising:
- obtaining first output data based on a specific process to obtain specific output data corresponding to specific input data;
- acquiring first input data based on the obtained first output data;
- extracting, based on a similarity degree between the first input data and each of a plurality of input history data items, second input data from the plurality of input history data items, wherein the plurality of input history data items corresponds to a history of the specific input data of a case of past execution of the specific process;
- presenting the extracted second input data;
- deleting, based on the extracted second input data, from the plurality of input history data items, specific data which includes an inconsistent label corresponding to the first input data; and
- updating the plurality of input history data items based on the deleted specific data.

* * * * *